US008638047B2

(12) United States Patent
Chiang et al.

(10) Patent No.: US 8,638,047 B2
(45) Date of Patent: Jan. 28, 2014

(54) TWO-TERMINAL CURRENT CONTROLLER AND RELATED LED LIGHTING DEVICE

(71) Applicant: IML International, Grand Cayman (KY)

(72) Inventors: Yung-Hsin Chiang, New Taipei (TW); Yi-Mei Li, New Taipei (TW); Alberto Giovanni Viviani, Mountian View, CA (US)

(73) Assignee: IML International, Ugland House, Grand Cayman (KY)

( * ) Notice: Subject to any disclaimer, the term of this patent is extended or adjusted under 35 U.S.C. 154(b) by 0 days.

(21) Appl. No.: 13/743,345

(22) Filed: Jan. 17, 2013

(65) Prior Publication Data
US 2013/0127354 A1    May 23, 2013

Related U.S. Application Data

(63) Continuation-in-part of application No. 13/052,132, filed on Mar. 21, 2011.

(30) Foreign Application Priority Data

Dec. 7, 2010   (TW) .............................. 99142624 A

(51) Int. Cl.
*H05B 37/02* (2006.01)
(52) U.S. Cl.
USPC .............................. 315/291; 315/307; 315/308
(58) Field of Classification Search
USPC .......... 315/200 R, 209 R, 224–226, 291, 307, 315/308, 312
See application file for complete search history.

(56) References Cited

U.S. PATENT DOCUMENTS

| 8,299,724 B2* | 10/2012 | Huynh ........................ 315/291 |
| 2006/0267514 A1 | 11/2006 | Xu |
| 2008/0001547 A1 | 1/2008 | Negru |
| 2009/0322235 A1 | 12/2009 | Shiu |
| 2011/0254467 A1 | 10/2011 | Chiang |
| 2011/0273112 A1 | 11/2011 | Lee |
| 2011/0279044 A1* | 11/2011 | Maiw ........................ 315/186 |

FOREIGN PATENT DOCUMENTS

| JP | 2006244848 A | 9/2006 |
| JP | 200859811 A | 3/2008 |
| JP | 2008130377 A | 6/2008 |
| JP | 2009134933 | 6/2009 |
| JP | 201165922 A | 3/2011 |
| JP | 2011524621 A | 9/2011 |
| KR | 1020110023551 A | 3/2011 |

(Continued)

*Primary Examiner* — Jimmy Vu
(74) *Attorney, Agent, or Firm* — Winston Hsu; Scott Margo

(57) ABSTRACT

A two-terminal current controller having a current limiting unit and an adjusting unit regulates a first current flowing through a load according to a load voltage. When the load voltage does not exceed a first voltage, the two-terminal current controller operates in a first mode for conducting a second current associated a rectified AC voltage, thereby limiting the first current to zero and adjusting the second current accordingly. When the load voltage is between the first voltage and a second voltage, the two-terminal current controller operates in a second mode for conducting the second current, thereby limiting the first current to zero and limiting the second current to a constant value larger than zero. When the load voltage exceeds the second voltage, the two-terminal current controller operates in a third mode for turning off the current limiting unit. The adjusting unit can adjust the predetermined value and the second voltage.

45 Claims, 28 Drawing Sheets

(56) References Cited

FOREIGN PATENT DOCUMENTS

| KR | 101132194 | B1 | 4/2012 |
| TW | 201136443 | A1 | 10/2011 |
| WO | 2009153696 | A1 | 12/2009 |
| WO | 2011058805 | A1 | 5/2011 |
| WO | 2013011924 | A1 | 1/2013 |

* cited by examiner

US 8,638,047 B2

TWO-TERMINAL CURRENT CONTROLLER AND RELATED LED LIGHTING DEVICE

CROSS-REFERENCE TO RELATED APPLICATIONS

This is a continuation-in-part of U.S. application Ser. No. 13/052,132 filed on Mar. 21, 2011.

BACKGROUND OF THE INVENTION

1. Field of the Invention

The present invention is related to a two-terminal current controller and related LED lighting device, and more particularly, to a two-terminal current controller and related LED lighting device with high power factor and overvoltage protection.

2. Description of the Prior Art

Compared to traditional incandescent bulbs, light-emitting diodes (LEDs) are advantageous in low power consumption, long lifetime, small size, no warm-up time, fast reaction speed, and the ability to be manufactured as small or array devices. In addition to outdoor displays, traffic signs, and LCD backlight for various electronic devices such as mobile phones, notebook computers or televisions, LEDs are also widely used as indoor/outdoor lighting devices in place of fluorescent or incandescent lamps.

FIG. 1 is a diagram illustrating the voltage-current chart of a light-emitting diode. When the forward-bias voltage of the light-emitting diode is smaller than its barrier voltage Vb, the light-emitting diode functions as an open-circuited device since it only conducts a negligible amount of current. When the forward-bias voltage of the light-emitting diode exceeds its barrier voltage Vb, the light-emitting diode functions as a short-circuited device since its current increases exponentially with the forward-bias voltage. The barrier voltage Vb, whose value is related to the material and doping type of the light-emitting diode, is typically between 1.5 and 3.5 volts. For most current values, the luminescence of the light-emitting diode is proportional to the current. Therefore, a current source is generally used for driving light-emitting diodes in order to provide uniform luminescence.

FIG. 2 is a diagram of a prior art LED lighting device 600. The LED lighting device 600 includes a power supply circuit 110, a resistor R and a luminescent device 10. The power supply circuit 110 is configured to receive an alternative-current (AC) voltage VS having positive and negative periods and convert the output of the AC voltage VS in the negative period using a bridge rectifier 112, thereby providing a rectified AC voltage $V_{AC}$ for driving the luminescent device 10. The resistor R is coupled in series with the luminescent device 10 for regulating its current $I_{LED}$. In many applications, multiple light-emitting diodes are required in order to provide sufficient brightness. Since a light-emitting diode is a current-driven device whose luminescence is proportional to its driving current, the luminescent device 10 normally adopts a plurality of light-emitting diodes $D_1$-$D_n$ coupled in series. Assuming that the barrier voltage of all the light-emitting diodes $D_1$-$D_n$ is equal to the ideal value Vb and the rectified AC voltage $V_{AC}$ periodically varies between 0 and $V_{MAX}$, a forward-bias voltage larger than n*Vb is required for turning on the luminescent device 10. Therefore, the energy between 0 and n*Vb can not be used. As the number of the light-emitting diodes $D_1$-$D_n$ increases, a higher forward-bias voltage is required for turning on the luminescent device 10; as the number of the light-emitting diodes $D_1$-$D_n$ decreases, the large driving current when $V_{AC}=V_{MAX}$ may impact the reliability of the light-emitting diodes. Therefore, the prior art LED lighting device 600 needs to make compromise between the effective operational voltage range and the reliability. Meanwhile, the current-limiting resistor R also consumes extra power and may thus lower system efficiency.

FIG. 3 is a diagram of another prior art LED lighting device 700. The LED lighting device 700 includes a power supply circuit 110, an inductor L, a capacitor C, a switch SW, and a luminescent device 10. The power supply circuit 110 is configured to receive an AC voltage VS having positive and negative periods and convert the output of the AC voltage VS in the negative period using a bridge rectifier 112, thereby providing a rectified AC voltage $V_{AC}$ for driving the luminescent device 10. The inductor L and the switch SW are coupled in series with the luminescent device 10 for limiting its current $I_{LED}$. The capacitor C is coupled in parallel with the luminescent device 10 for absorbing voltage ripples of the power supply circuit 110. For the same current-regulating function, the inductor L consumes less energy than the resistor R of the LED lighting device 600. However, the inductor L for regulating current and the capacitor for stabilizing voltage largely reduce the power factor of the LED lighting device 700 and the energy utilization ratio. Therefore, the prior art LED lighting device 700 needs to make compromise between the effective operational voltage range and the brightness.

SUMMARY OF THE INVENTION

The present invention provides a two-terminal current controller for controlling a current passing through a load. During a rising period of a rectified AC voltage when a voltage established across the load does not exceed a first voltage, the two-terminal current controller operates in a first mode. During the rising period when the voltage established across the load exceeds the first voltage but does not exceed a second voltage, the two-terminal current controller operates in a second mode. During the rising period when the voltage established across the load exceeds the second voltage, the two-terminal current controller operates in a third mode. During the rising period when the voltage established across the load drops to a third voltage smaller than the second voltage after exceeding the second voltage, the two-terminal current controller is configured to operate in the second mode when a difference between the second and third voltages exceeds a first hysteresis band or operate in the third mode when a difference between the second and third voltages does not exceed the first hysteresis band. The two-terminal current controller includes a current limiting unit and an adjusting unit. The current limiting unit is configured to conduct a second current associated with the rectified AC voltage, regulate the second current according to the voltage established across the load and maintain the first current at zero when the two-terminal current controller operates in the first mode; conduct the second current, maintain the second current at a predetermined value larger than zero and maintain the first current at zero when the two-terminal current controller operates in the second mode; and switch off when the two-terminal current controller operates in the third mode. The adjusting unit is configured to adjust the predetermined value and the second voltage.

The present invention also provides an LED lighting device with overvoltage protection. The LED lighting device includes a first luminescent device for providing light according to a first current; a second luminescent device coupled in series to the first luminescent device for providing light according to a second current; a first impedance device for limiting the first current or the second current within a first predetermined range when a voltage established across the first luminescent device and the second luminescent device exceeds a first predetermined value; and a first two-terminal current controller coupled in parallel to the first luminescent device and in series to the second luminescent device and configured to regulate the second current according to a voltage established across the two-terminal current controller. During a rising period of a rectified AC voltage when the voltage established across the first luminescent device does not exceed a first voltage, the first two-terminal current controller operates in a first mode. During the rising period when the voltage established across the first luminescent device exceeds the first voltage but does not exceed a second voltage, the first two-terminal current controller operates in a second mode. During the rising period when the voltage established across the first luminescent device exceeds the second voltage, the first two-terminal current controller operates in a third mode. The first two-terminal current controller includes a current limiting unit configured to conduct a third current associated with the rectified AC voltage, regulate the third current according to the voltage established across the first luminescent device and maintain the first current at zero when the first two-terminal current controller operates in the first mode; conduct the third current, maintain the third current at a second predetermined value larger than zero and maintain the first current at zero when the first two-terminal current controller operates in the second mode; and switch off for equalizing the first current and the second current when the first two-terminal current controller operates in the third mode. The adjusting unit is configured to adjust the second predetermined value and the second voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
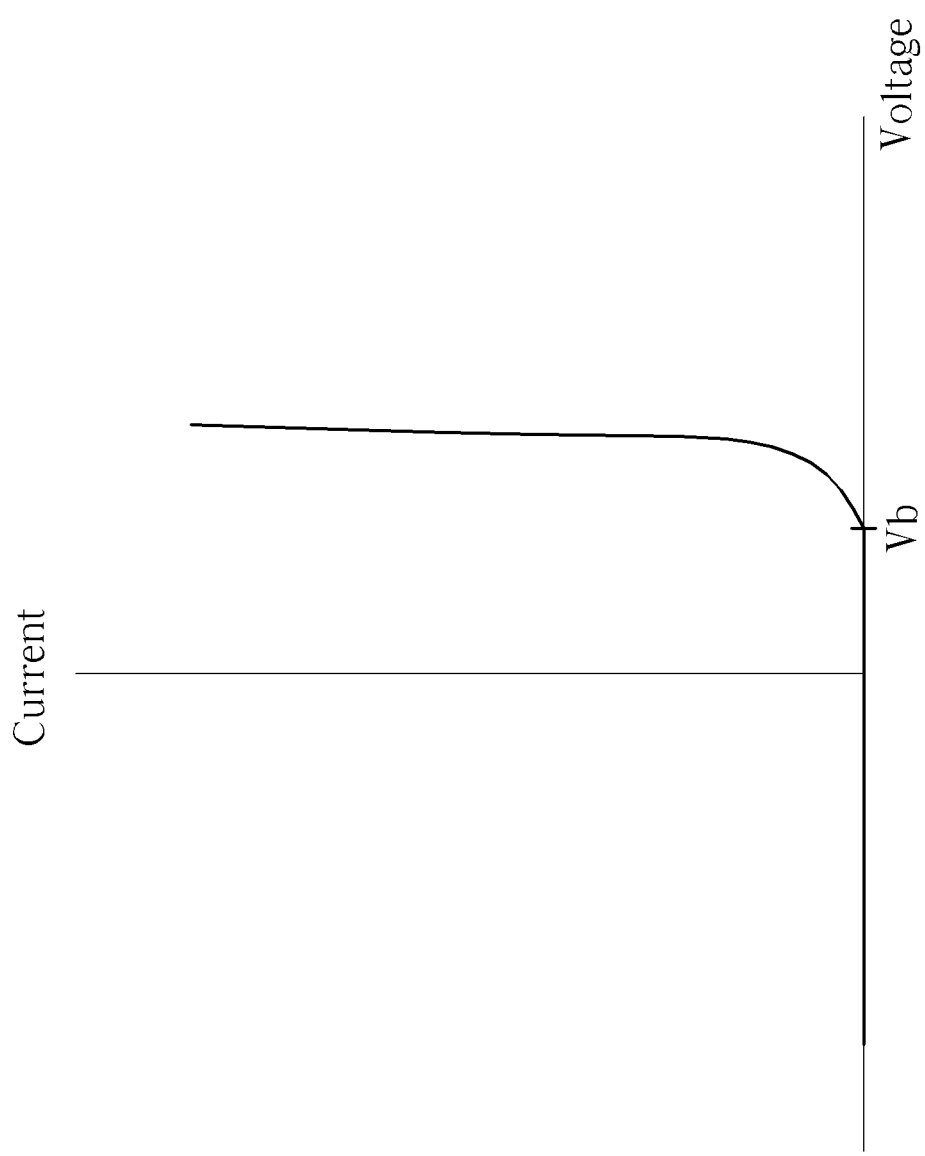
FIG. 1 is a diagram illustrating the voltage-current chart of a light-emitting diode.
Figure 2:
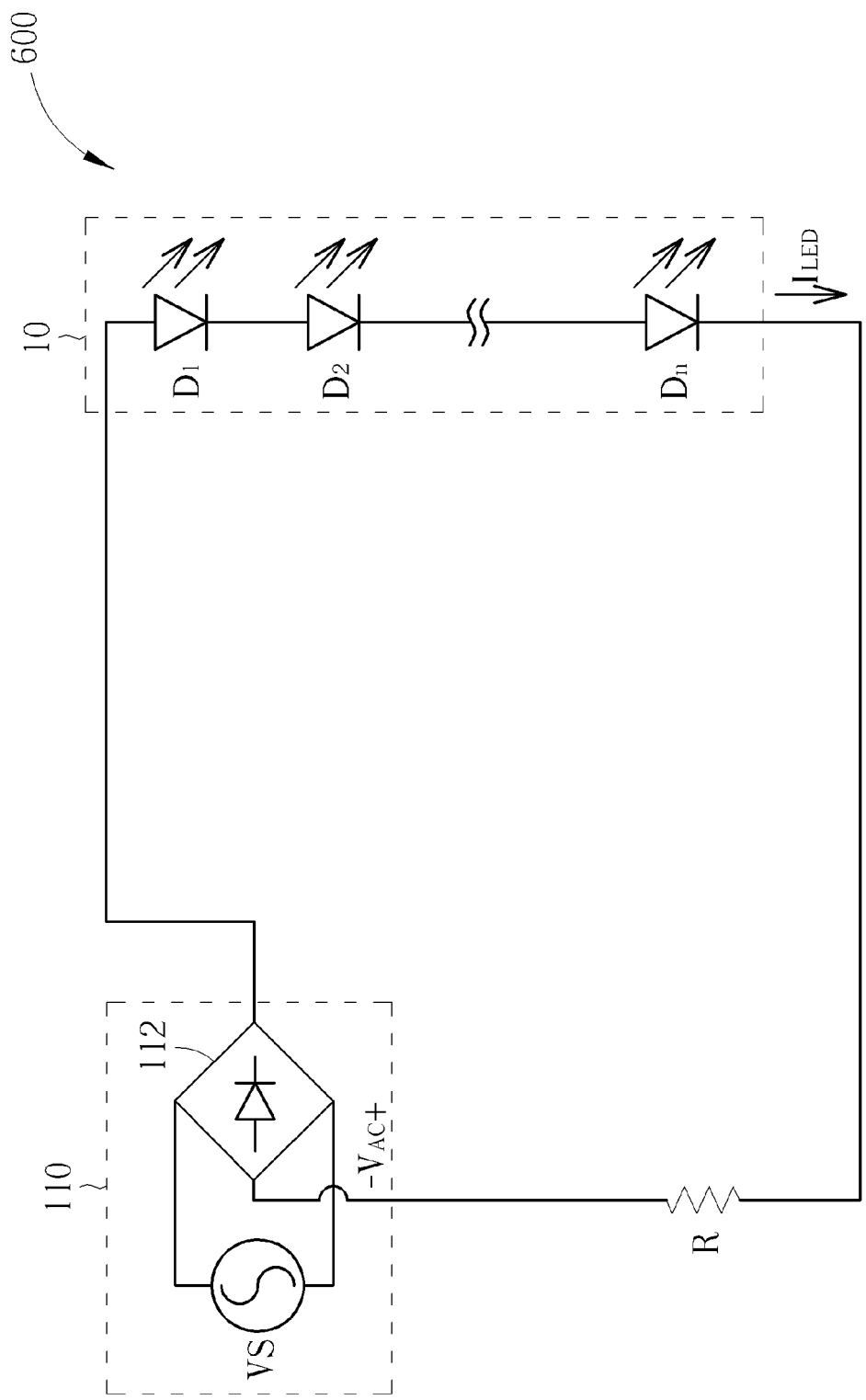
FIGS. 2 and 3 are diagrams of prior art LED lighting devices.
Figure 3:
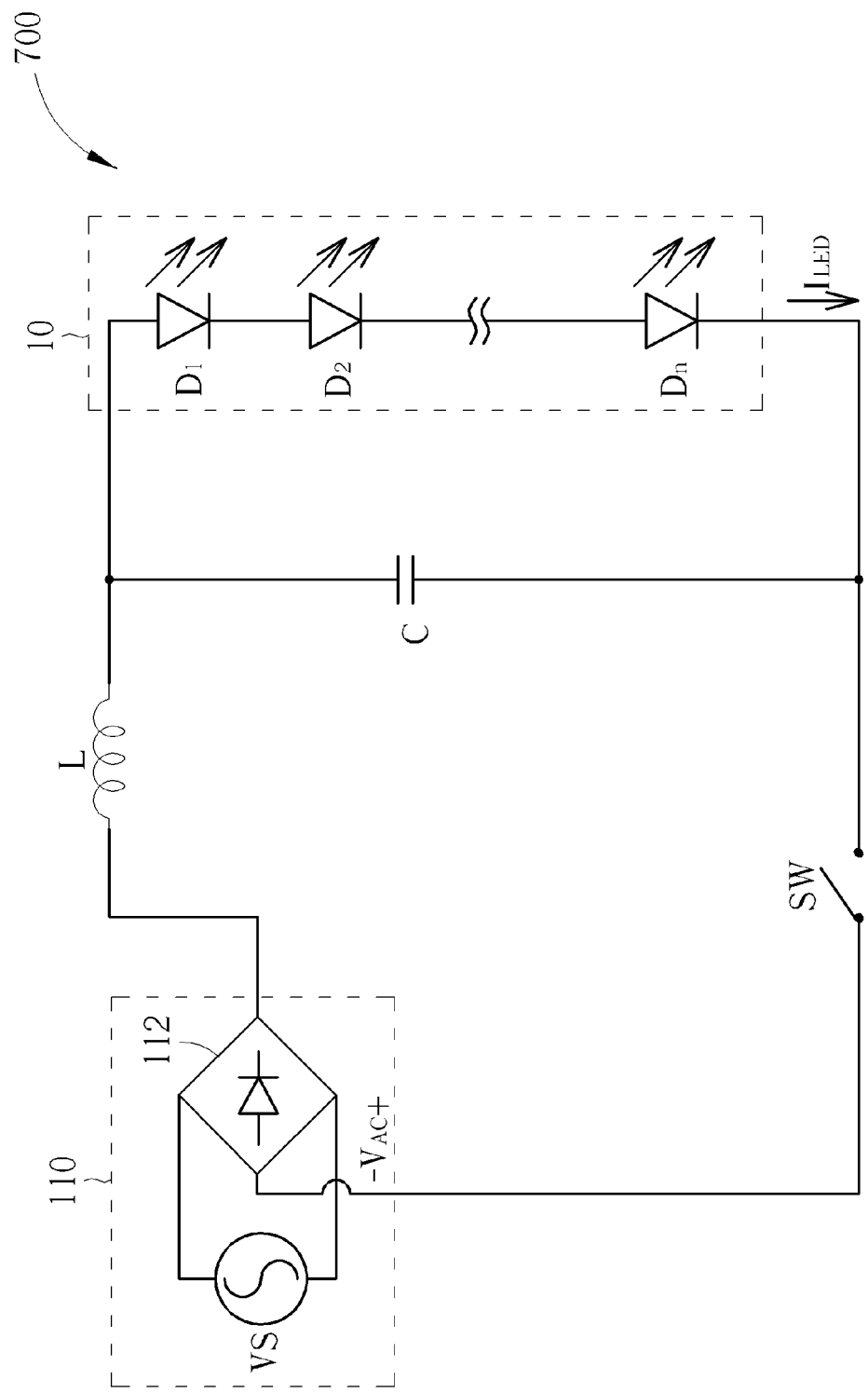
Figure 4:
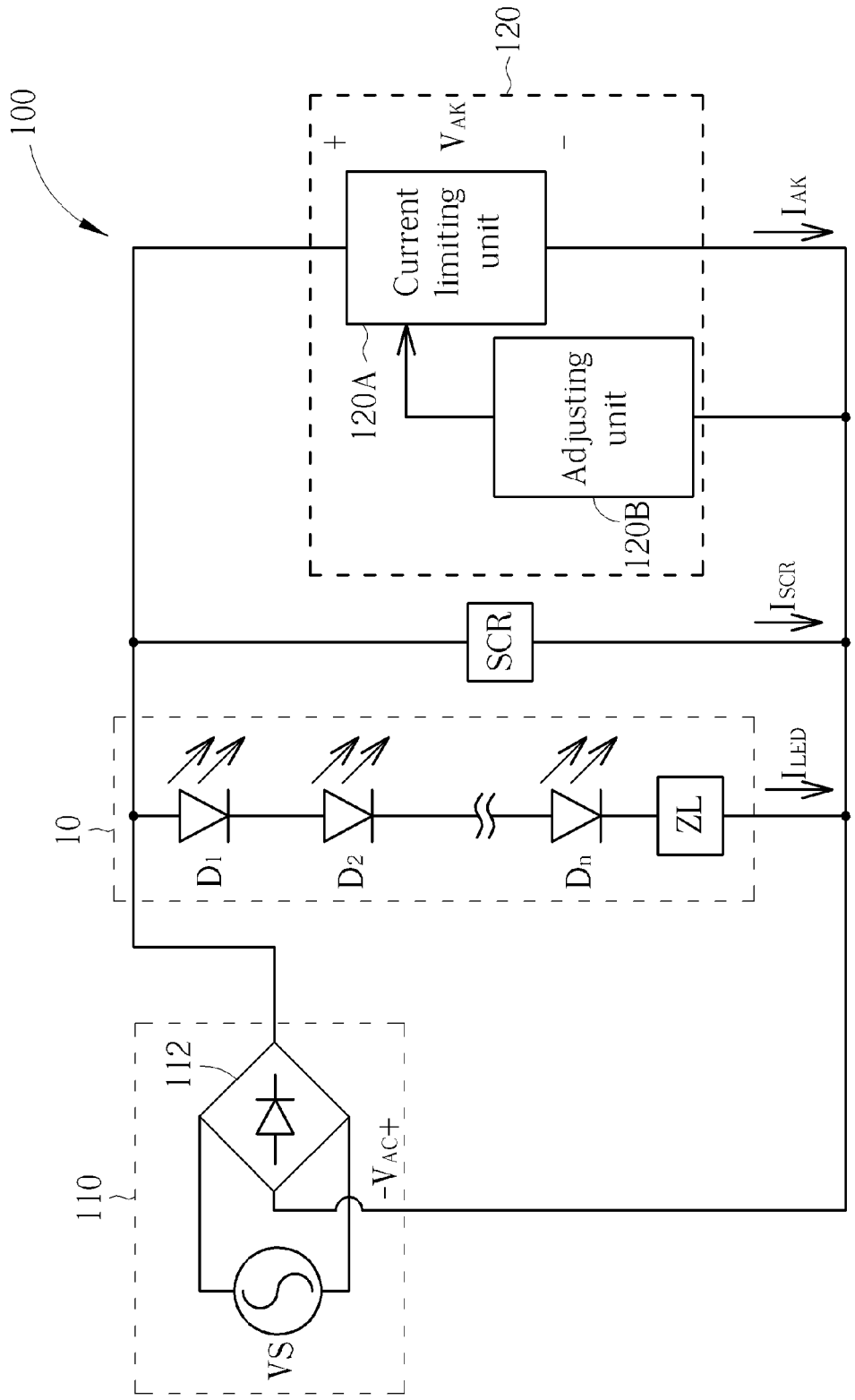
FIGS. 4-5, 9-10, 15-18, 21 and 23 are diagrams of LED lighting devices according to embodiments of the present invention.
Figure 5:
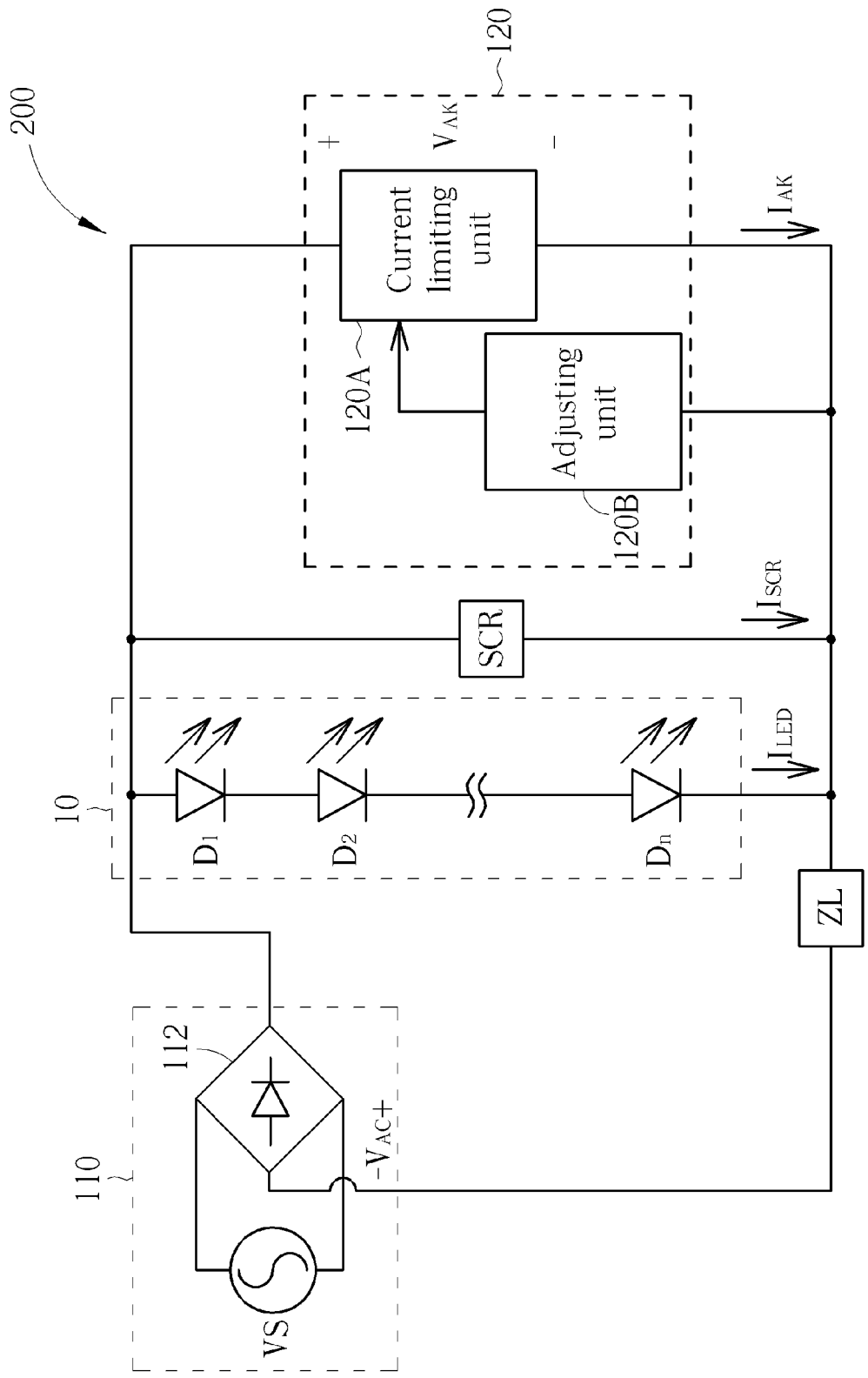

FIG. 4 is a diagram of an LED lighting device 100 according to a first embodiment of the present invention. FIG. 5 is a diagram of an LED lighting device 200 according to a second embodiment of the present invention. Each of the LED lighting devices 100 and 200 includes a power supply circuit 110, a two-terminal current controller 120, a luminescent device 10, a silicon-controlled rectifier SCR and an impedance device ZL. The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the luminescent device 10. The luminescent device 10 may adopt n light-emitting units $D_1$-$D_n$ coupled in series, each of which may include a single light-emitting diode or multiple light-emitting diodes. FIGS. 4 and 5 depict the embodiment using a single light-emitting diode, but do not limit the scope of the present invention. $I_{LED}$ represents the current passing through the luminescent device 10 and $V_{AK}$ represents the voltage established across the two-terminal current controller 120. The two-terminal current controller 120, coupled in parallel to the luminescent device 10 and the power supply circuit 110, includes a current limiting unit 120A and an adjusting unit 120B. The two-terminal current controller 120 is configured to control the current $I_{LED}$ passing through the luminescent device 10 according to the rectified AC voltage $V_{AC}$, wherein $I_{AK}$ represents the current passing through the two-terminal current controller 120. In the first and second embodiments of the present invention, the barrier voltage Vb' of the two-terminal current controller 120 is smaller than the overall barrier voltage n*Vb of the luminescent device 10 (assuming the barrier voltage of each light-emitting unit is equal to Vb).

The silicon-controlled rectifier SCR, coupled in parallel to the luminescent device 10 and the two-terminal current controller 120, is configured to provide electrostatic discharge (ESD) protection to the two-terminal current controller 120 and provide open-circuit protection to the luminescent device 10.

Figure 24:
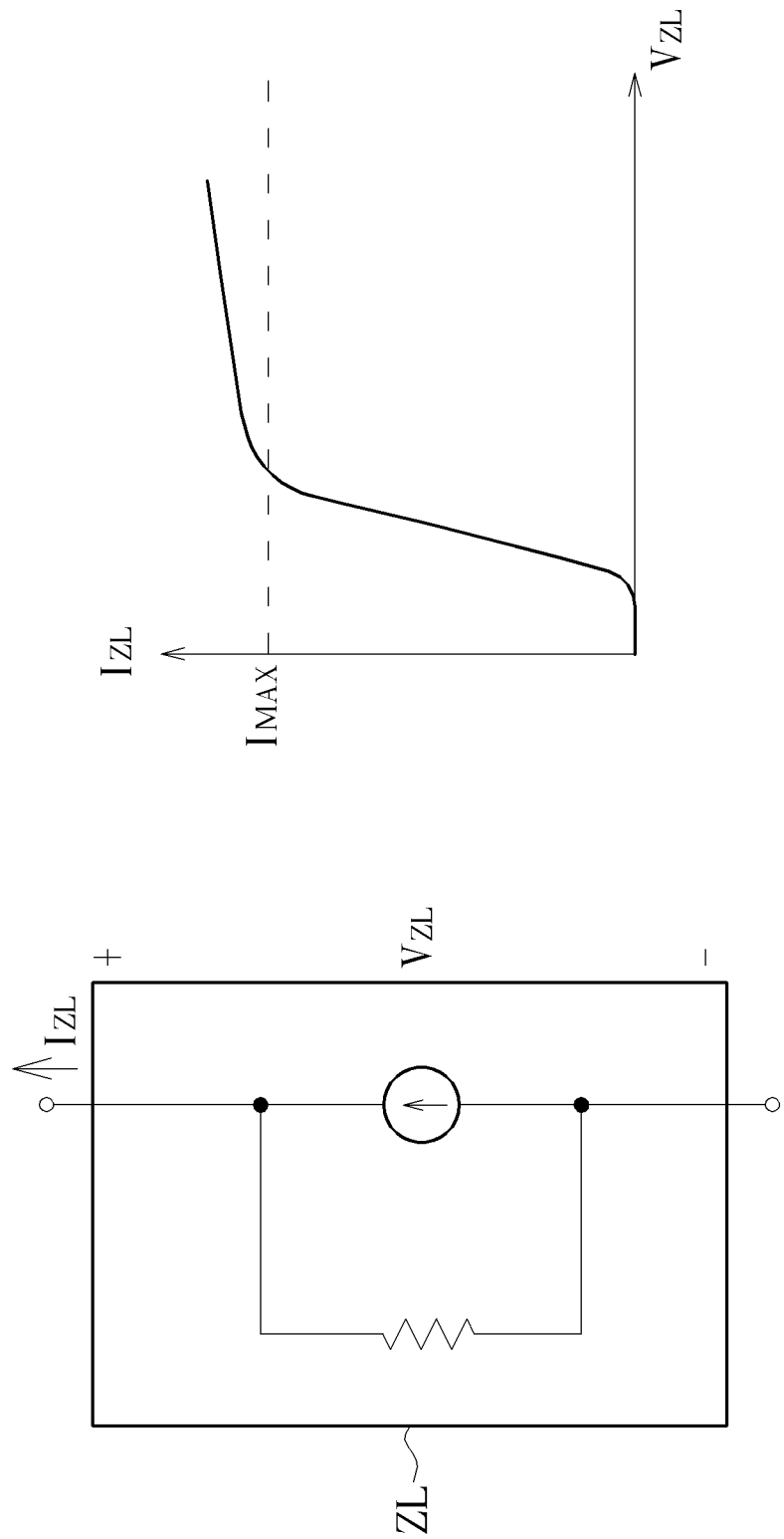
FIGS. 24 and 25 are diagrams illustrating embodiments of the impedance device according to the present invention.
Figure 25:
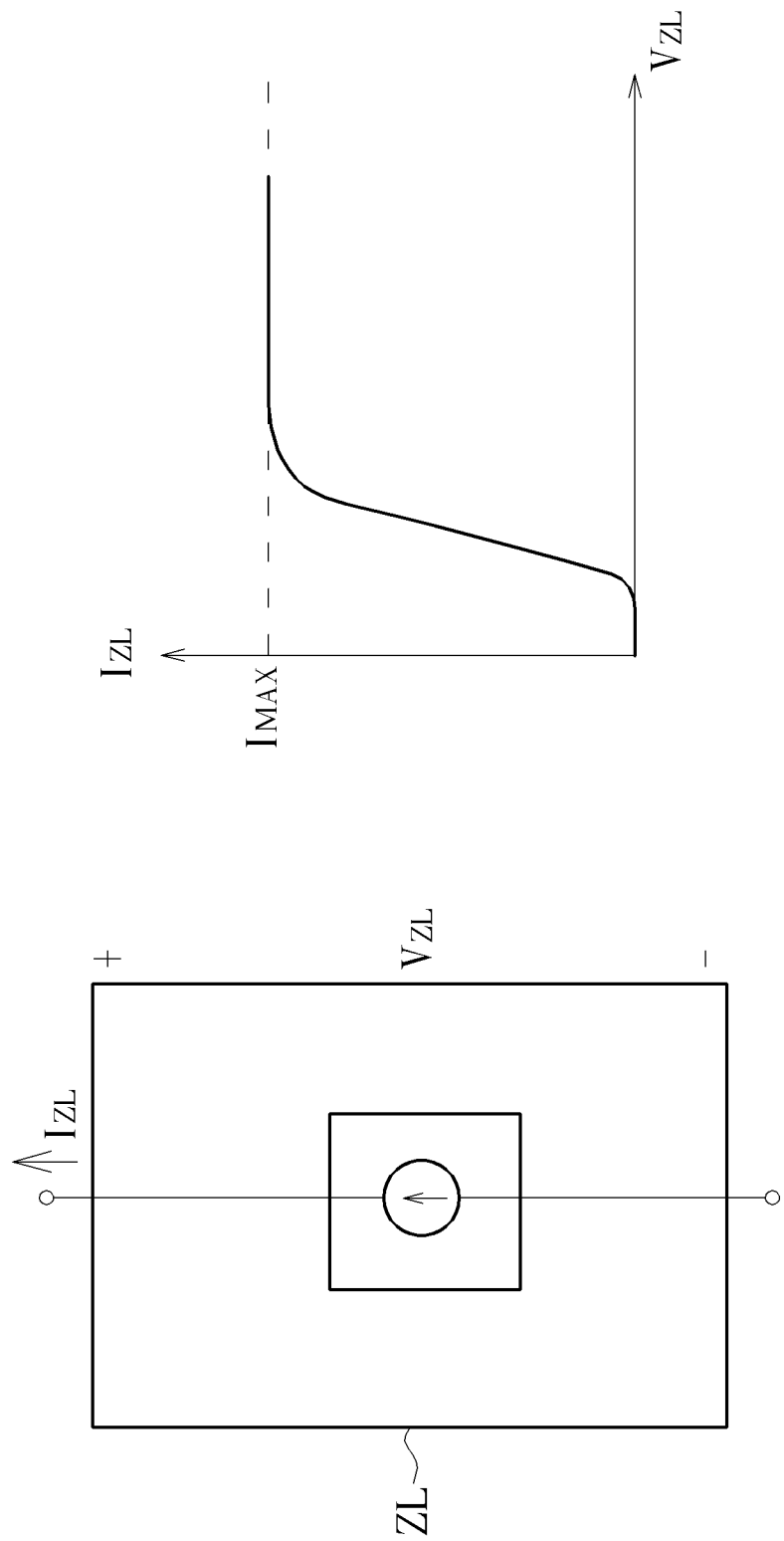

In the LED lighting device 100 according to the first embodiment of the present invention, the two-terminal current controller 120 is coupled in parallel to the serially-coupled impedance device ZL and the luminescent device 10. In the LED lighting device 200 according to the second embodiment of the present invention, the impedance device ZL is coupled in series to the luminescent device 10 and the two-terminal current controller 120. The impedance device ZL may include a resistor, a capacitor, any device providing a resistive path, or any combination thereof. For example, the impedance device ZL may be implemented as a constant current source/sink integrated circuit (IC) whose structure and I-V curves are as depicted in FIGS. 24 and 25. When the power supply circuit 110 somehow fluctuates and the rectified AC voltage $V_{AC}$ is raised above its upper design limit, the impedance device ZL may provide overvoltage protection to the luminescent device 10.

Figure 6:
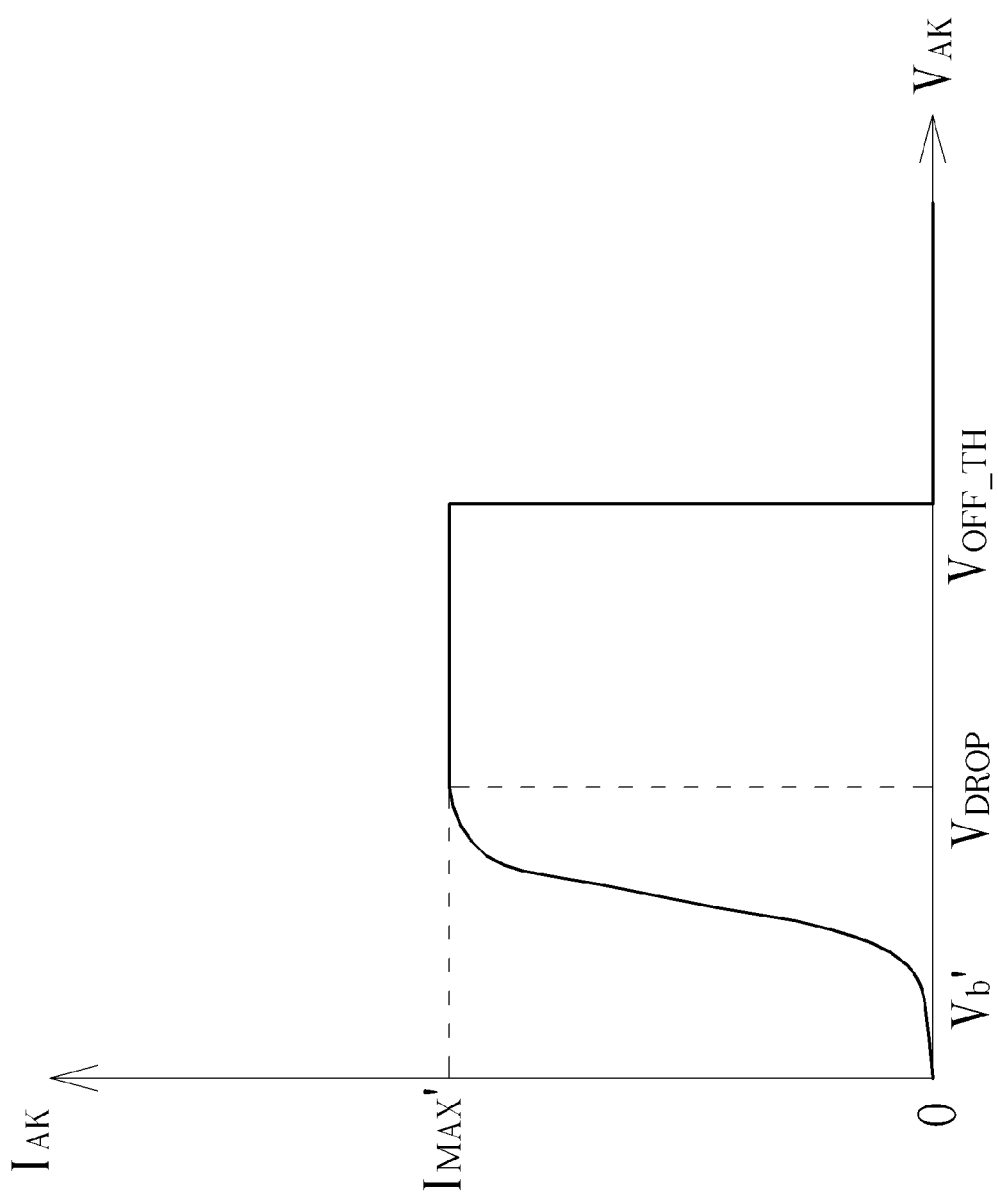
FIGS. 6, 13, and 19A-19D are diagrams illustrating the current-voltage chart of a two-terminal current controller to the present invention.

FIG. 6 is a diagram illustrating the current-voltage chart of the two-terminal current controller 120 in the LED lighting device 100 or 200. In FIG. 6, the vertical axis represents the current $I_{AK}$ passing through the current limiting unit 120A, and the horizontal axis represents the voltage $V_{AK}$ established across the current limiting unit 120A. In the first embodiment of the present invention, the two-terminal current controller 120 operates in a first mode in which the current limiting unit 120A functions as a voltage-controlled device when $0 < V_{AK} < V_{DROP}$. In other words, when the voltage $V_{AK}$ exceeds the barrier voltage Vb' of the two-terminal current controller 120, the current $I_{AK}$ changes with the voltage $V_{AK}$ in a specific manner. The two-terminal current controller 120 operates in a second mode in which the current limiting unit 120A functions as a constant current source when $V_{DROP}<V_{AK}<V_{OFF\_TH}$. In other words, the current $I_{AK}$ is maintained at an adjustable specific current $I_{MAX}$, instead of changing with the voltage $V_{AK}$. The two-terminal current controller 120 functions in a third mode in which the current limiting unit 120A is turned off when $V_{AK}>V_{OFF\_TH}$. In other words, the two-terminal current controller 120 functions as an open-circuited device since the current $I_{AK}$ is suddenly reduced to zero. Meanwhile, the adjusting unit 120B may provide flexible designs with various characteristics by adjusting the value of $I_{MAX}$, when the two-terminal current controller 120 operates in the second mode and the value of $V_{OFF\_TH}$ for switching between the second mode and the third mode.

Figure 7:
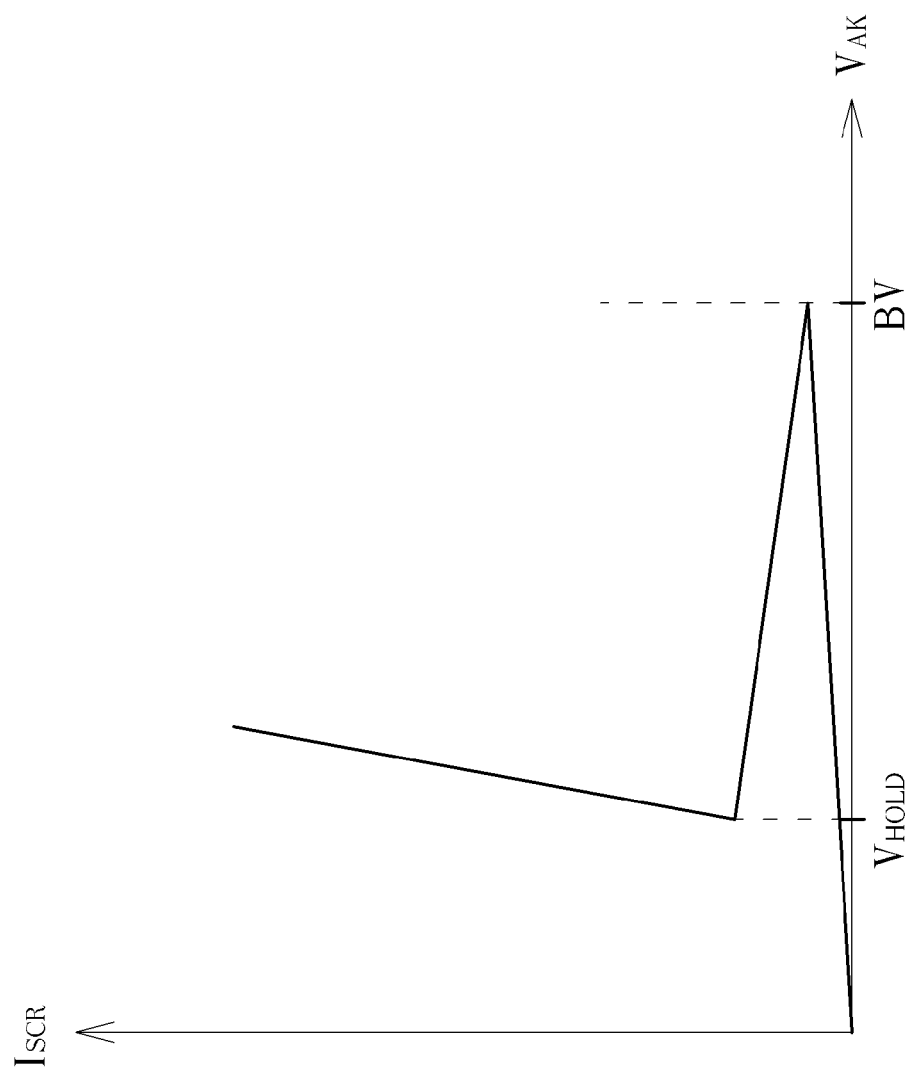
FIG. 7 is a diagram illustrating the current-voltage chart of a silicon-controlled rectifier according to the present invention.

FIG. 7 is a diagram illustrating the current-voltage chart of the silicon-controlled rectifier SCR. In FIG. 7, the vertical axis represents the current $I_{SCR}$ passing through the silicon-controlled rectifier SCR, and the horizontal axis represents the voltage $V_{AK}$ established across the silicon-controlled rectifier SCR. When the voltage $V_{AK}$ is smaller than a break-over voltage BV, the silicon-controlled rectifier SCR is configured to operate in an "off" mode and only conduct a negligible leakage current. If an ESD voltage spike higher than the break-over voltage BV occurs, the silicon-controlled rectifier SCR is triggered and starts to operate in a "resistance" mode in which the voltage established across the silicon-controlled rectifier SCR is larger than the holding voltage $V_{HOLD}$ but much smaller than the break-over voltage BV, and the current $I_{SCR}$ increases as the voltage $V_{AK}$ increases. Therefore, the silicon-controlled rectifier SCR may protect the two-terminal current controller 120 from possible ESD damages. Meanwhile, if the voltage $V_{AK}$ ramps up above the break-over voltage BV when one of the light-emitting units in the luminescent device 10 somehow becomes open, the silicon-controlled rectifier SCR may be triggered for bypassing the current $I_{LED}$, thereby providing LED open-circuit protection.

Figure 8:
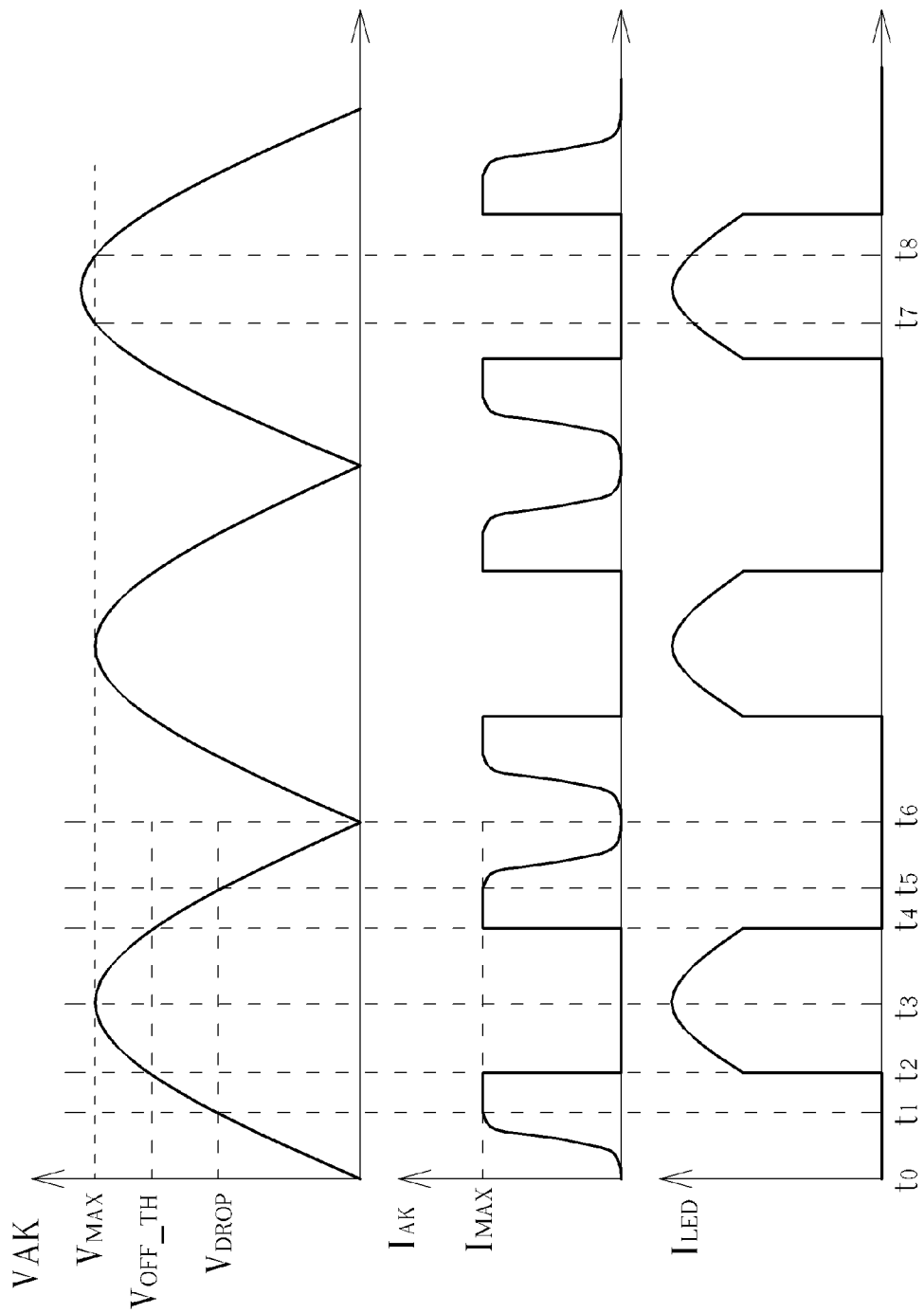
FIGS. 8, 14, 20, and 22 are diagrams illustrating the variations in the related current and voltage when operating the LED lighting device of the present invention.

FIG. 8 illustrates the waveforms of the voltage $V_{AK}$, the current $I_{AK}$ and the current $I_{LED}$. Since the voltage $V_{AK}$ is associated with the rectified AC voltage $V_{AC}$ whose value varies periodically with time, a cycle between $t_0$-$t_6$ is used for illustration, wherein the period between $t_0$-$t_3$ is the rising period of the rectified AC voltage $V_{AC}$ and the period between $t_3$-$t_6$ is the falling period of the rectified AC voltage $V_{AC}$. Between $t_0$-$t_1$ when the voltage $V_{AK}$ gradually increases, the current limiting unit 120A of the two-terminal current controller 120 is first turned on, after which the current $I_{AK}$ increases with the voltage $V_{AK}$ in a specific manner and the current $I_{LED}$ is maintained at zero. Between $t_1$-$t_2$ when the voltage $V_{AK}$ is larger than the voltage $V_{DROP}$, the current limiting unit 120A of the two-terminal current controller 120 is configured to limit the current $I_{AK}$ to a specific current $I_{MAX}$, and the current $I_{LED}$ remains zero since the luminescent device 10 is still turned off. Between $t_2$-$t_4$ when the voltage $V_{AK}$ is larger than the voltage $V_{OFF\_TH}$, the current limiting unit 120A of the two-terminal current controller 120 is turned off and the current associated with the rectified AC voltage $V_{AC}$ thus flows through the luminescent device 10. Therefore, the current $I_{AK}$ is reduced to zero, and the current $I_{LED}$ changes with the voltage $V_{AK}$. Between $t_4$-$t_5$ when the voltage $V_{AK}$ drops to a value between the voltage $V_{DROP}$ and the voltage $V_{OFF\_TH}$, the current limiting unit 120A of the two-terminal current controller 120 is turned on, thereby limiting the current $I_{AK}$ to the specific current $I_{MAX}$ and maintaining the current $I_{LED}$ at zero again. Between $t_5$-$t_6$ when the voltage $V_{AK}$ drops below the voltage $V_{DROP}$, the current $I_{AK}$ decreases with the voltage $V_{AK}$ in a specific manner. In other words, the two-terminal current controller 120 operates in the first mode during $t_0$-$t_1$ and $t_5$-$t_6$ when $0<V_{AK}<V_{DROP}$; the two-terminal current controller 120 operates in the second mode during $t_1$-$t_2$ and $t_4$-$t_5$ when $V_{DROP}<V_{AK}<V_{OFF\_TH}$; the two-terminal current controller 120 operates in the third mode during $t_2$-$t_4$ when $V_{AK}>V_{OFF\_TH}$.

Figure 9:
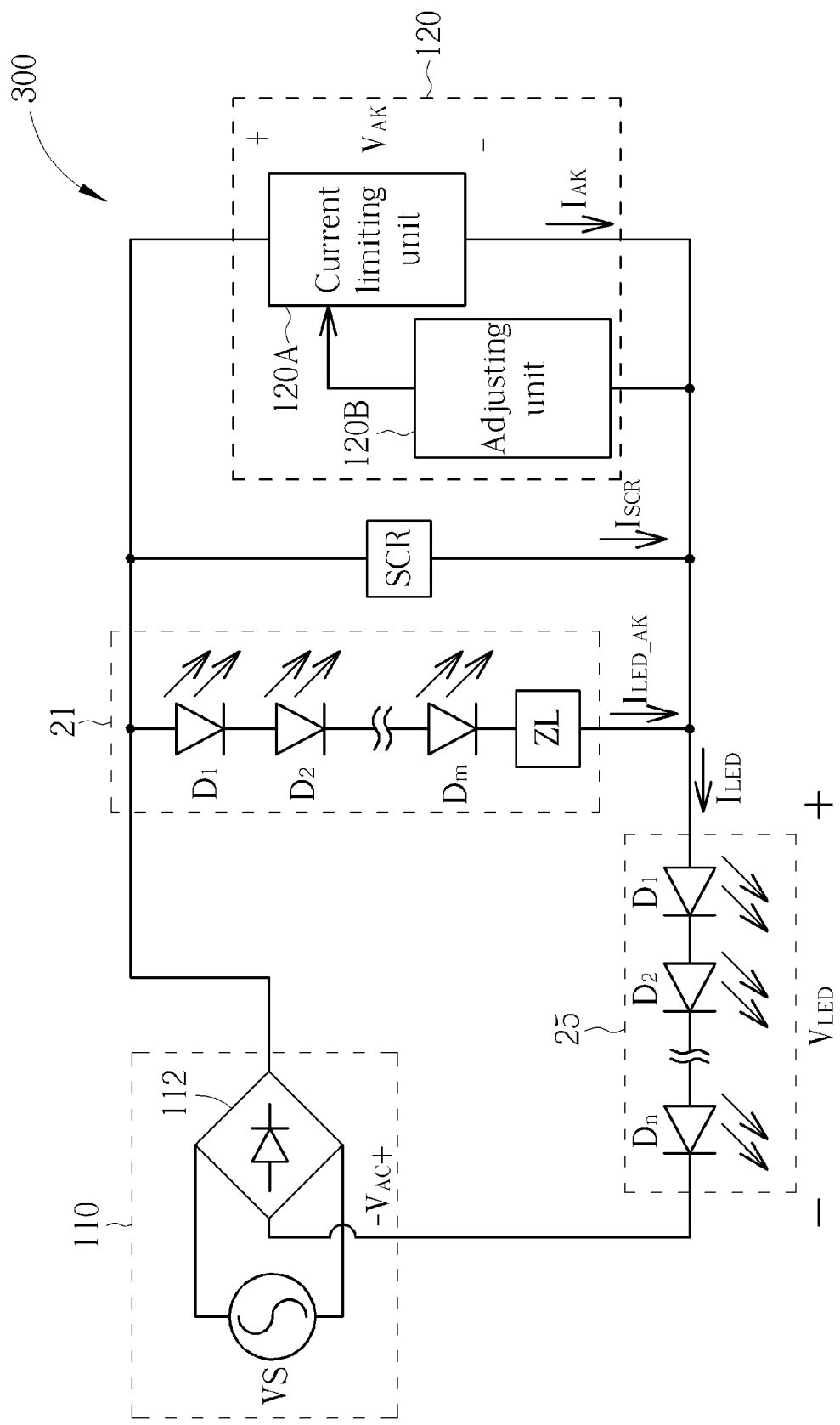
Figure 10:
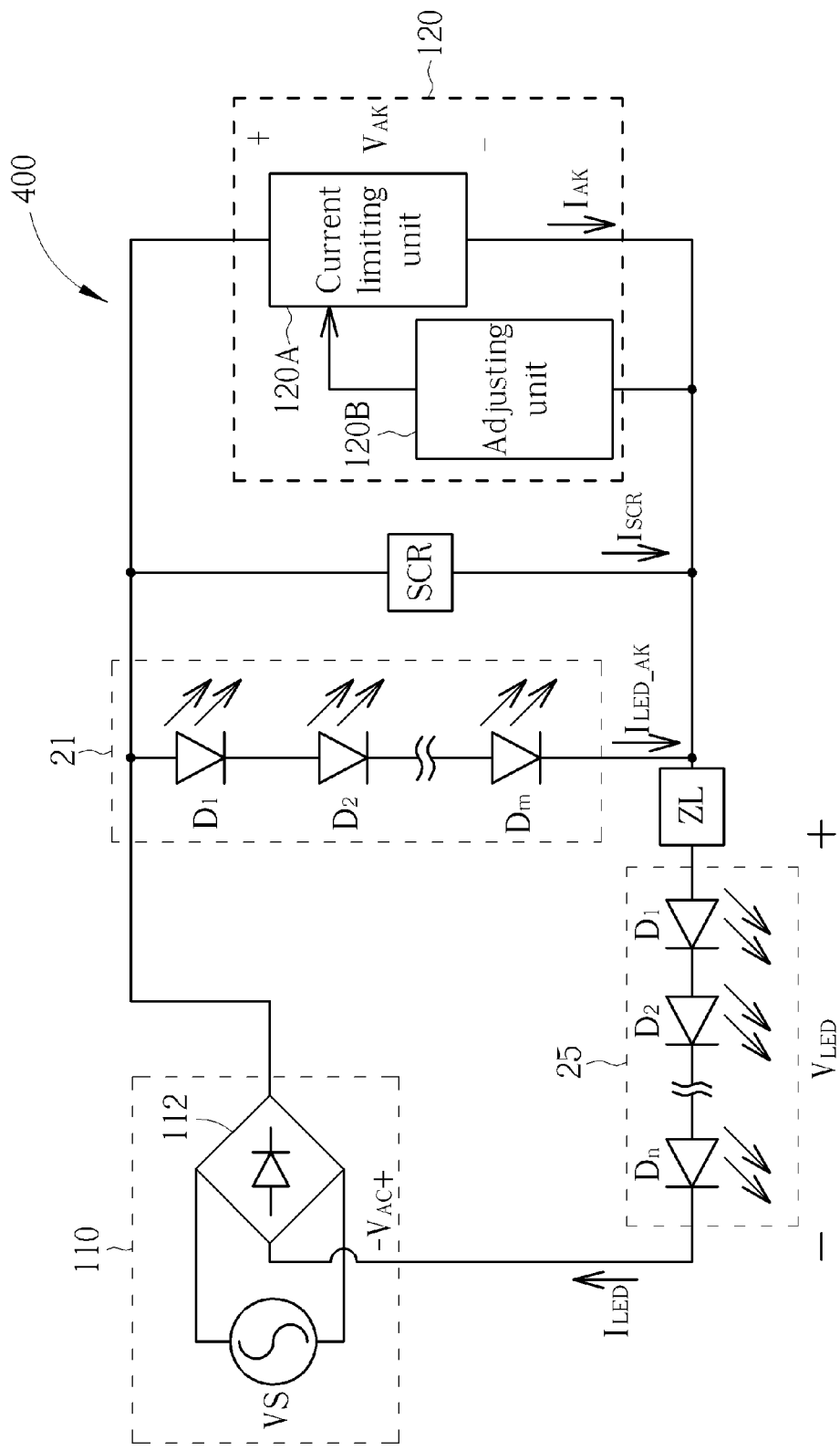

FIG. 9 is a diagram of an LED lighting device 300 according to a third embodiment of the present invention. FIG. 10 is a diagram of an LED lighting device 400 according to a fourth embodiment of the present invention. Each of the LED lighting devices 300 and 400 includes a power supply circuit 110, a two-terminal current controller 120, two luminescent devices 21 and 25, a silicon-controlled rectifier SCR, and an impedance device ZL. Each two-terminal current controller 120 includes a current limiting unit 120A and an adjusting unit 120B.

In the LED lighting device 300 according to the third embodiment of the present invention, the two-terminal current controller 120 is coupled in parallel to the serially-coupled impedance device ZL and the luminescent device 21. The luminescent device 21 includes m light-emitting units $D_1$-$D_m$ coupled in series, wherein $I_{LED\_AK}$ represents the current flowing through the luminescent device 21 and $V_{AK}$ represents the voltage established across the luminescent device 21 and the impedance device ZL. The luminescent device 25 is coupled in series to the two-terminal current controller 120 and includes n light-emitting units $D_1$-$D_n$ coupled in series, wherein $I_{LED}$ represents the current flowing through the luminescent device 25 and $V_{LED}$ represents the voltage established across the luminescent device 25. The barrier voltage Vb' of the two-terminal current controller 120 is smaller than the overall barrier voltage m*Vb of the luminescent device 21 (assuming the barrier voltage of each luminescent element is equal to Vb). Each light-emitting unit may include a single light-emitting diode or multiple light-emitting diodes. FIG. 9 depicts the embodiment using a single light-emitting diode, but does not limit the scope of the present invention. The silicon-controlled rectifier SCR, coupled in parallel to the luminescent device 21 and the two-terminal current controller 120, is configured to provide ESD protection to the two-terminal current controller 120 and provide open-circuit protection to the luminescent device 21.

In the LED lighting device 400 according to the fourth embodiment of the present invention, the impedance device ZL is coupled in series to the luminescent devices 21, 25 and the two-terminal current controller 120. The luminescent device 21 includes m light-emitting units $D_1$-$D_m$ coupled in series, wherein $I_{LED\_AK}$ represents the current flowing through the luminescent device 21 and $V_{AK}$ represents the voltage established across the luminescent device 21. The luminescent device 25 is coupled in series to the two-terminal current controller 120 and includes n light-emitting units $D_1$-$D_n$ coupled in series, wherein $I_{LED}$ represents the current flowing through the luminescent device 25 and $V_{LED}$ represents the voltage established across the luminescent device 25. The barrier voltage Vb' of the two-terminal current controller 120 is smaller than the overall barrier voltage m*Vb of the luminescent device 21 (assuming the barrier voltage of each luminescent element is equal to Vb). Each light-emitting unit may include a single light-emitting diode or multiple light-emitting diodes. FIG. 10 depicts the embodiment using a single light-emitting diode, but does not limit the scope of the present invention. The silicon-controlled rectifier SCR, coupled in parallel to the luminescent device 21 and the two-terminal current controller 120, is configured to provide ESD protection to the two-terminal current controller 120 and provide open-circuit protection to the luminescent device 21.

Figure 11:
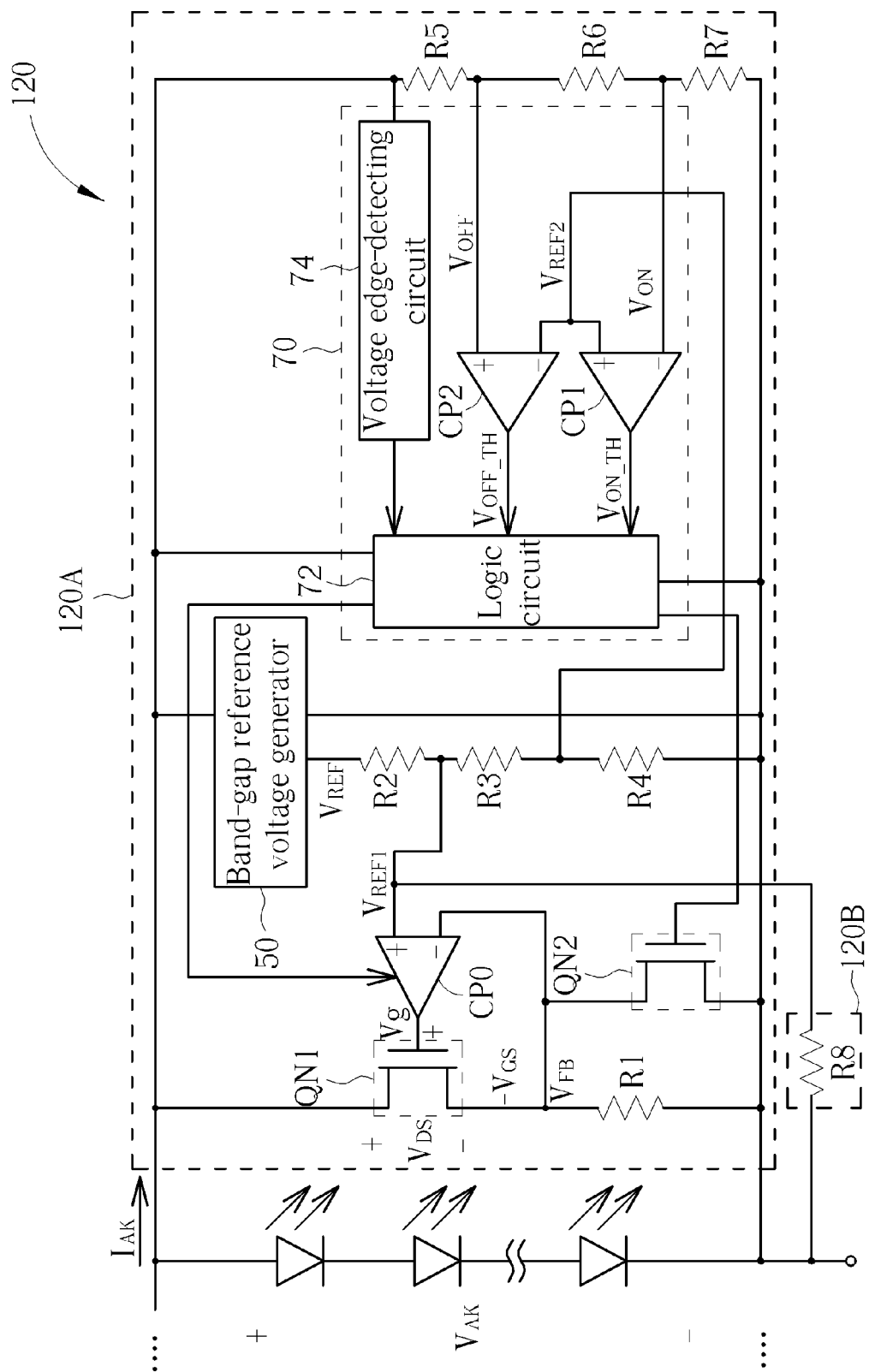
FIGS. 11 and 12 are diagrams of illustrated embodiments of the two-terminal current controller according to the present invention.
Figure 12:
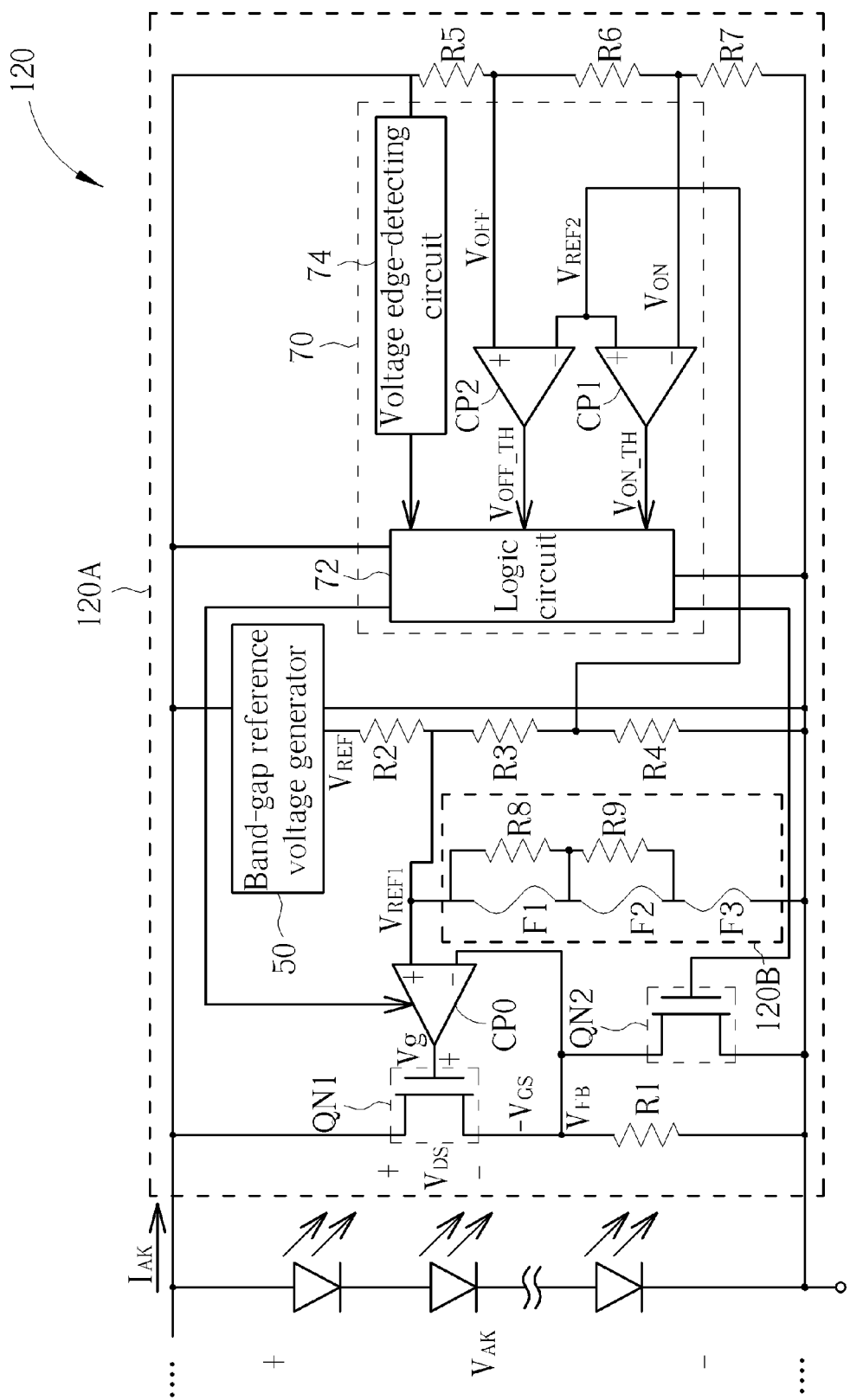

FIGS. 11 and 12 are diagrams of illustrated embodiments of the two-terminal current controller 120 according to the present invention. In these two embodiments, the current limiting unit 120A of the two-terminal current controller 120 includes resistors R1-R7, switches QN1 and QN2, a comparator CP0, a band-gap reference voltage generator 50, and a voltage-detecting circuit 70. The band-gap reference voltage generator 50 generally adopts devices having positive and negative temperature coefficients in order to achieve temperature-independent output characteristic, thereby providing a stable reference voltage $V_{REF}$.

The resistor R1 is used for detecting the current flowing through the switch QN1, thereby providing a corresponding feedback voltage $V_{FB}$. The resistors R2-R4 forms a voltage-dividing circuit which provides a reference voltage $V_{REF1}$ and a reference voltage $V_{REF2}$ according to the reference voltage $V_{REF}$. The comparator CP0, having a positive input end for receiving the reference voltage $V_{REF1}$ and a negative input end for receiving the feedback voltage $V_{FB}$, is configured to output a control signal $V_g$ to the switch QN1 according to the relationship between the reference voltage $V_{REF1}$ and the feedback voltage $V_{FB}$.

The switch QN1 may include a field effect transistor (FET), a bipolar junction transistor (BJT) or other devices having similar function. In the embodiments illustrated in FIGS. 11 and 12, an N-type metal-oxide-semiconductor (NMOS) transistor is used for illustration. With the gate coupled to the comparator CP0 for receiving the control signal $V_g$, the drain-to-source voltage, the gate-to-source voltage and the threshold voltage of the switch QN1 are represented by $V_{DS}$, $V_{GS}$ and $V_{TH}$, respectively. When the switch QN1 operates in the linear region, its drain current is mainly determined by the drain-to-source voltage $V_{DS}$; when the switch QN1 operates in the saturation region, its drain current is only related to the gate-to-source voltage $V_{GS}$.

The switch QN2 may include an FET, a BJT or other devices having similar function. In the embodiments illustrated in FIGS. 11 and 12, an NMOS transistor is used for illustration. The switch QN2 is coupled in parallel with the resistor R1. When the voltage $V_{AK}$ starts to ramp up but is still too low for providing a sufficient turn-on current, the switch QN2 may be turned on for lowering the effective impedance of the resistor R1, thereby shortening the turn-on time. When $V_{AK}$ ramps up near $V_{DROP}$, the switch QN2 is turned off.

During the rising period of the rectified AC voltage $V_{AC}$, the drain-to-source voltage $V_{DS}$ of the switch QN1 increases with the voltage $V_{AK}$. When the voltage $V_{AK}$ does not exceed $V_{DROP}$, the drain-to-source voltage $V_{DS}$ is smaller than the difference between the gate-to-source voltage $V_{GS}$ and the threshold voltage $V_{TH}$ ($V_{DS} < V_{GS} - V_{TH}$). The comparator CP0 provides the control signal $V_g$ which allows the switch QN1 to operate in the linear region where the drain current is mainly determined by the drain-to-source voltage $V_{DS}$. In other words, the two-terminal current controller 120 is configured to provide the current $I_{AK}$ and voltage $V_{AK}$ whose relationship corresponds to the I-V characteristic of the switch QN1 when operating in the linear region.

During the rising period of the rectified AC voltage $V_{AC}$ when the $V_{DROP} < V_{AK} < V_{OFF\_TH}$, the drain-to-source voltage $V_{DS}$ is larger than the difference between the gate-to-source voltage $V_{GS}$ and the threshold voltage $V_{TH}$ ($V_{DS} > V_{GS} - V_{TH}$). The comparator CP0 provides the control signal $V_g$ which results in $V_{GS} > V_{TH}$, thereby allowing the switch QN1 to operate in the saturation region. At this time, the drain current of the comparator CP0 is only related to the gate-to-source voltage $V_{GS}$. In other words, the current $I_{AK}$ does not change with the voltage $V_{AK}$.

The voltage-detecting circuit 70 includes a logic circuit 72, a voltage edge-detecting circuit 74, and two hysteresis comparators CP1 and CP2. The hysteresis comparator CP1, having a positive input end for receiving the reference voltage $V_{REF2}$ and a negative input end for receiving a voltage $V_{ON}$, is configured to determine the value of $V_{ON\_TH}$ according the relationship between the voltage $V_{ON}$ and the reference voltage $V_{REF2}$. The hysteresis comparator CP2, having a positive input end for receiving a voltage $V_{OFF}$ and a negative input end for receiving the reference voltage $V_{REF2}$, is configured to determine the value of $V_{OFF\_TH}$ according the relationship between the voltage $V_{OFF}$ and the reference voltage $V_{REF2}$. The voltages $V_{ON\_TH}$ and $V_{OFF\_TH}$ are switching points when the two-terminal current controller 120 switches between operational modes, which will be explained in detail in subsequent paragraphs.

Meanwhile, when the voltages $V_{AK}$ is between $V_{OFF\_TH}$ and $V_{ON\_TH}$, the voltage edge-detecting circuit 74 is configured to determine whether the rectified AC voltage $V_{AC}$ is during the rising period or during the falling period. Based on the results of the voltage edge-detecting circuit 74 and the hysteresis comparators CP1 and CP2, the logic circuit 72 outputs a corresponding control signal to the comparator CP0. During the rising period of the rectified AC voltage $V_{AC}$ when the voltage $V_{AK}$ is between $V_{OFF\_TH}$ and $V_{ON\_TH}$, the comparator CP0 provides the control signal $V_g$ smaller than the threshold voltage $V_{TH}$, thereby turning off the switch QN1 and maintaining the current $I_{AK}$ at zero. During the falling period of the rectified AC voltage $V_{AC}$ when the voltage $V_{AK}$ is between $V_{ON\_TH}$ and $V_{OFF\_TH}$, the comparator CP0 provides the control signal $V_g$ larger than the threshold voltage $V_{TH}$, thereby operating the switch QN1 in the saturation region and maintaining the current $I_{AK}$ at $I_{MAX}$.

In the embodiment illustrated in FIG. 11, the adjusting unit 120B includes a resistor R8 whose value may be varied for adjusting how the reference voltage $V_{REF}$ is provided to the comparators CP0-CP2 by voltage division. In other words, the values of the reference voltages $V_{REF1}$ and $V_{REF2}$ may be adjusted flexibly. As previously illustrated, the comparator CP0 is configured to output the control signal $V_g$ to the switch QN1 according to the relationship between the reference voltage $V_{REF1}$ and the feedback voltage $V_{FB}$, the hysteresis comparator CP1 is configured to determine the value of $V_{ON\_TH}$ according to the relationship between the voltage $V_{ON}$ and the reference voltage $V_{REF2}$, and the hysteresis comparator CP2 is configured to output the value of $V_{OFF\_TH}$ according to the relationship between the voltage $V_{OFF}$ and the reference voltage $V_{REF2}$. Since the drain current of the switch QN1 is only related to the gate-to-source voltage $V_{GS}$ when operating in the saturation region, the values of the current $I_{MAX}$ (when the two-terminal current controller 120 operates in the second mode) and the voltages $V_{ON\_TH}$ and $V_{OFF\_TH}$ (for switching between the second and third modes) may be adjusted using the adjusting unit 120B. Therefore, the present invention can provide flexible designs with various characteristics.

In the embodiment illustrated in FIG. 12, the adjusting unit 120B includes resistors R8-R9 and fuses F1-F3. The resistors R8-R9 may be coupled to the resistors R3 and R4 in many ways by laser-burning or current-burning the fuses F1-F3, thereby adjusting the equivalent resistance when performing voltage division. For example, the resistor R8 may be coupled in parallel with the resistor string R3+R4 by burning the fuse F1 alone, the resistor string R8+R9 may be coupled in parallel with the resistor string R3+R4 by burning the fuses F1 and F2 alone, and no extra resistor is coupled in parallel with the resistor string R3+R4 by burning the fuse F3 alone. The present invention may adopt other resistor-fuse configurations, with resistors coupled in series or in parallel, as long as similar results can be achieved. Therefore, the present invention may adjust how the reference voltage $V_{REF}$ is provided to the comparators CP0-CP2 by voltage division. In other words, the values of the reference voltages $V_{REF1}$ and $V_{REF2}$ may be adjusted flexibly. As previously illustrated, the comparator CP0 is configured to output the control signal $V_g$ to the switch QN1 according to the relationship between the reference voltage $V_{REF1}$ and the feedback voltage $V_{FB}$, the hysteresis comparator CP1 is configured to determine the value of $V_{ON\_TH}$ according to the relationship between the voltage $V_{ON}$ and the reference voltage $V_{REF2}$, and the hysteresis comparator CP2 is configured to determine the value of $V_{OFF\_TH}$ according to the relationship between the voltage $V_{OFF}$ and the reference voltage $V_{REF2}$. Since the drain current of the switch QN1 is only related to the gate-to-source voltage $V_{GS}$ when operating in the saturation region, the values of the current $I_{MAX}$ (when the two-terminal current controller 120 operates in the second mode) and the voltages $V_{ON\_TH}$ and $V_{OFF\_TH}$ (for switching between the second and third modes) may be adjusted using the adjusting unit 120B. Therefore, the present invention can provide flexible designs with various characteristics.

In the embodiment illustrated in FIG. 11, the user may adjust the current by himself. In the embodiment illustrated in FIG. 12, manufacturer of the two-terminal current controller 120 may adjust the current for the user. For example, the adjusting unit may be integrated in an IC of the two-terminal current controller. Built-in resistors and laser-burning are well-known to those skilled in the art. FIGS. 11 and 12 are merely for illustrative purpose and do not limit the scope of the present invention.

Figure 13:
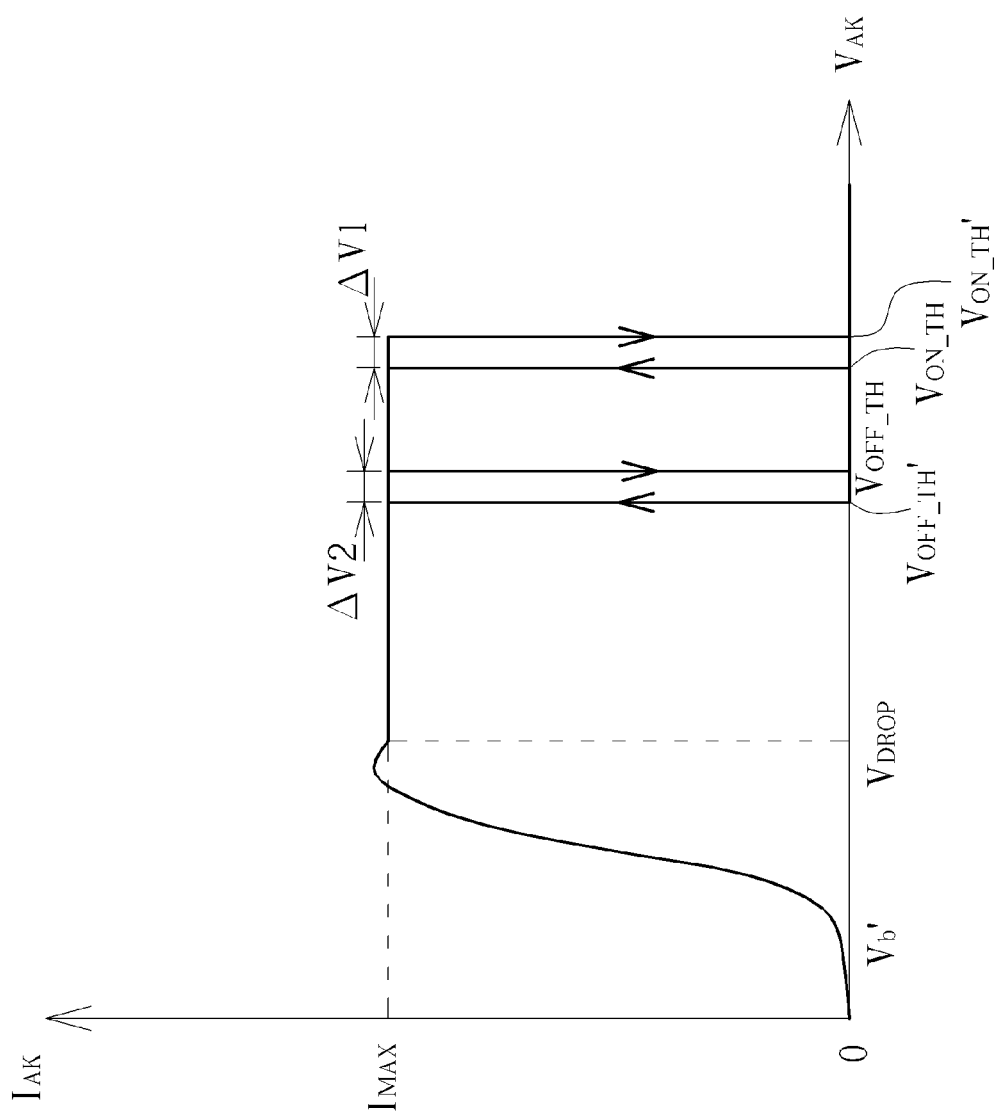

FIG. 13 is a diagram illustrating the current-voltage chart of the two-terminal current controller 120 in the LED lighting devices 300 and 400. In FIG. 13, the vertical axis represents the current $I_{AK}$ passing through the current limiting unit 120A, and the horizontal axis represents the voltage $V_{AK}$ established across the two-terminal current controller 120.

During the rising period of the rectified AC voltage $V_{AC}$, the two-terminal current controller 120 operates in the first mode in which the current limiting unit 120A functions as a voltage-controlled device when $0<V_{AK}<V_{DROP}$. In other words, when the voltage $V_{AK}$ exceeds the barrier voltage Vb' of the two-terminal current controller 120, the current $I_{AK}$ changes with the voltage $V_{AK}$ in a specific manner. As previously stated, the switch QN2 is turned on when the voltage $V_{AK}$ is still too low for providing a sufficient turn-on current. Since the effective impedance of the resistor R1 may be lowered by the turned-on switch QN2, the current $I_{AK}$ may ramp up more rapidly. When the current $I_{AK}$ reaches $I_{MAX}$, the switch QN2 is then turned off.

During the rising period of the rectified voltage $V_{AC}$, the two-terminal current controller 120 operates in the second mode in which the current limiting unit 120A functions as a constant current source when $V_{DROP}<V_{AK}<V_{OFF\_TH}$. In other words, the current $I_{AK}$ is maintained at an adjustable specific current $I_{MAX}$ instead of changing with the voltage $V_{AK}$.

During the rising period of the rectified voltage $V_{AC}$, the two-terminal current controller 120 operates in the third mode in which the current limiting unit 120A is turned off when $V_{AK}>V_{OFF\_TH}$. In other words, the two-terminal current controller 120 functions as an open-circuited device since the current $I_{AK}$ is suddenly reduced to zero.

During the falling period of the rectified AC voltage $V_{AC}$, the two-terminal current controller 120 operates in the second mode in which the current limiting unit 120A is turned on for limiting the current $I_{AK}$ to the specific current $I_{MAX}$ when $V_{AK}<V_{ON\_TH}$. The two-terminal current controller 120 operates in the first mode in which the current limiting unit 120A functions as a voltage-controlled device when $0<V_{AK}<V_{DROP}$. In other words, when the voltage $V_{AK}$ exceeds the barrier voltage Vb' of the two-terminal current controller 120, the current $I_{AK}$ changes with the voltage $V_{AK}$ in a specific manner. Meanwhile, the adjusting unit 120B may provide flexible designs with various characteristics by adjusting the value of $I_{MAX}$ when the two-terminal current controller 120 operates in the second mode and the value of $V_{OFF\_TH}$ for switching between the second mode and the third mode.

In the present invention, the hysteresis comparators CP1 and CP2 are configured to provide hysteresis bands ΔV1 and ΔV2 in order to prevent small voltage fluctuations due to noise from causing undesirable rapid switches between operation modes. More specifically, the hysteresis comparator CP1 introduces two switching points, $V_{ON\_TH}$ for falling voltages and $V_{ON\_TH}'$ for rising voltages, which define the hysteresis band ΔV1. Similarly, the hysteresis comparator CP2 introduces two switching points, $V_{OFF\_TH}$ for rising voltages and $V_{OFF\_TH}'$ for falling voltages, which define the hysteresis band ΔV2.

During the rising period of the rectified voltage $V_{AC}$ when $V_{AK}$ exceeds $V_{OFF\_TH}$, the two-terminal current controller 120 switches to the third mode. If the voltage level of $V_{AK}$ somehow fluctuates near $V_{OFF\_TH}$, the two-terminal current controller 120 may switch back to the second mode or stay in the third mode depending on whether the voltage fluctuation is within the hysteresis band ΔV2. For example, if $V_{AK}$ reaches a value V2 between $V_{OFF\_TH}$ and $V_{ON\_TH}$, drops to a value V1 smaller than $V_{OFF\_TH}'$ and then resumes V2, the two-terminal current controller 120 is configured to sequentially operate in the third mode, the second mode and the third mode since the voltage fluctuation (V2-V1) is larger than the hysteresis band ΔV2. On the other hand, if $V_{AK}$ reaches a value V2 between $V_{OFF\_TH}$ and $V_{ON\_TH}$, drops to a voltage V1' between $V_{OFF\_TH}'$ and $V_{OFF\_TH}$, then resumes V2, the two-terminal current controller 120 is configured to stay in the third mode.

During the falling period of the rectified voltage $V_{AC}$ when $V_{AK}$ drops below $V_{ON\_TH}$, the two-terminal current controller 120 switches to the second mode. If the voltage level of $V_{AK}$ somehow fluctuates near $V_{ON\_TH}$, the two-terminal current controller 120 may switch back to the third mode or stay in the second mode depending on whether the voltage fluctuation is within the hysteresis band ΔV1. For example, if $V_{AK}$ drops to a value V2 between $V_{OFF\_TH}$ and $V_{ON\_TH}$, raises to a value V3 larger than $V_{ON\_TH}'$ and then resumes V2, the two-terminal current controller 120 is configured to sequentially operate in the second mode, the third mode, and the second mode. On the other hand, if $V_{AK}$ drops to a value V2 between $V_{OFF\_TH}$ and $V_{ON\_TH}$, raises to a value V3' between $V_{ON\_TH}$ and $V_{ON\_TH}'$, then resumes V2, the two-terminal current controller 120 is configured to stay in the second mode since the voltage fluctuation (V3'−V2) is smaller than the hysteresis band ΔV1.

Figure 14:
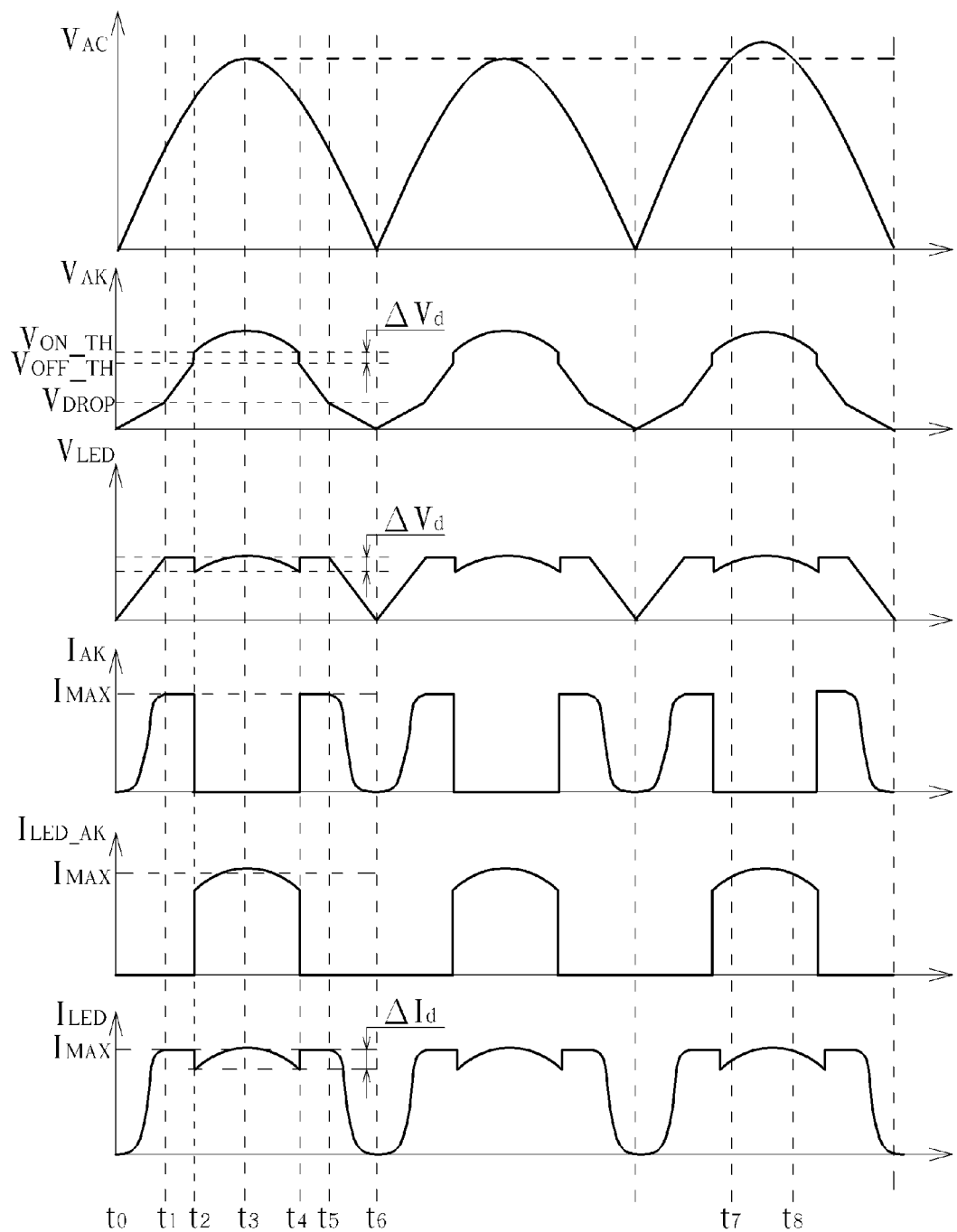

FIG. 14 illustrates the waveforms of the voltage $V_{AC}$, $V_{AK}$, $V_{LED}$ and the current $I_{AK}$, $I_{LED\_AK}$ and $I_{LED}$. Since the rectified AC voltage $V_{AC}$ varies periodically with time, a cycle between $t_0$-$t_6$ is used for illustration, wherein the period between $t_0$-$t_3$ is the rising period of the rectified AC voltage $V_{AC}$ and the period between $t_3$-$t_6$ is the falling period of the rectified AC voltage $V_{AC}$. Between $t_0$-$t_1$, the voltage $V_{AK}$ established across the two-terminal current controller 120 and the voltage $V_{LED}$ established across the n serially-coupled light-emitting units $D_1$-$D_n$ increase with the rectified AC voltage $V_{AC}$. Due to smaller barrier voltage, the current limiting unit 120A of the two-terminal current controller 120 is first turned on, after which the current $I_{AK}$ and the current $I_{LED}$ increase with the voltage $V_{AK}$ in a specific manner and the current $I_{LED\_AK}$ is maintained at zero.

Between $t_1$-$t_2$ when the voltage $V_{AK}$ is larger than the voltage $V_{DROP}$, the two-terminal current controller 120 is configured to limit the current $I_{AK}$ to the specific current $I_{MAX}$, and the current $I_{LED}$ remains zero since the luminescent device 21 is still turned off. With $V_F$ representing the forward-bias voltage of each light-emitting unit in the luminescent element 25, the value of the voltage $V_{LED}$ may be represented by m*$V_F$. Therefore, the luminescent device 21 is not conducting between $t_0$-$t_2$, and the rectified AC voltage $V_{AC}$ provided by the power supply circuit 110 is applied to the two-terminal current controller 120 and the n light-emitting units in the luminescent element 25.

Between $t_2$-$t_4$ when the voltage $V_{AK}$ is larger than the voltage $V_{OFF\_TH}$, the two-terminal current controller 120 is turned off and the current associated with the rectified AC voltage $V_{AC}$ thus passes through the luminescent elements 21 and 25. The current $I_{AC}$ is reduced to zero, and the current $I_{LED\_AK}$ changes with the voltage $V_{AK}$. Therefore, when the luminescent device 21 is conducting between $t_2$ and $t_4$, the voltage $V_{AK}$ established across the two-terminal current controller 120 is supplied as the luminescent device 20 performs voltage dividing on the rectified AC voltage $V_{AC}$.

Between $t_4$-$t_5$ when the voltage $V_{AK}$ drops to a value between the voltage $V_{DROP}$ and the voltage $V_{ON\_TH}$, the two-terminal current controller 120 is turned on, thereby limiting the current $I_{AK}$ to the specific current $I_{MAX}$ and maintaining the current $I_{LED\_AK}$ at zero again. Between $t_5$-$t_6$ when the voltage $V_{AK}$ drops below the voltage $V_{DROP}$, the current $I_{AK}$ decreases with the voltage $V_{AK}$ in a specific manner. As depicted in FIGS. 9, 10, and 14, the value of the current $I_{LED}$ is the sum of the current $I_{LED\_AK}$ and the current $I_{AK}$ (when the silicon-controlled rectifier SCR is off). The two-terminal current controller 120 according to the third and fourth embodiments of the present invention may increase the effective operational voltage range (such as the output of the rectified AC voltage $V_{AC}$ during $t_0$-$t_2$ and $t_4$-$t_6$), thereby increasing the power factor of the LED luminescence devices 300 and 400.

Figure 15:
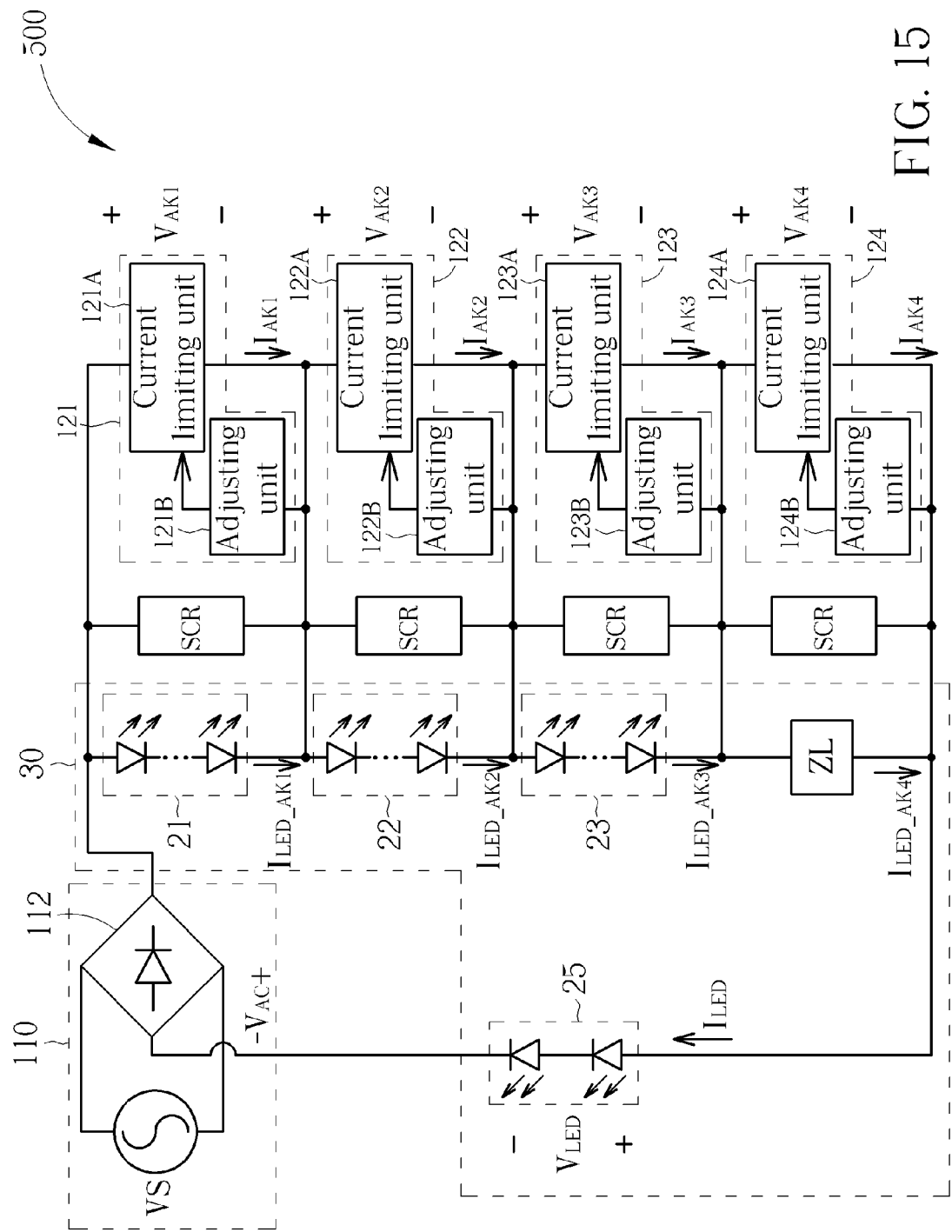
Figure 16:
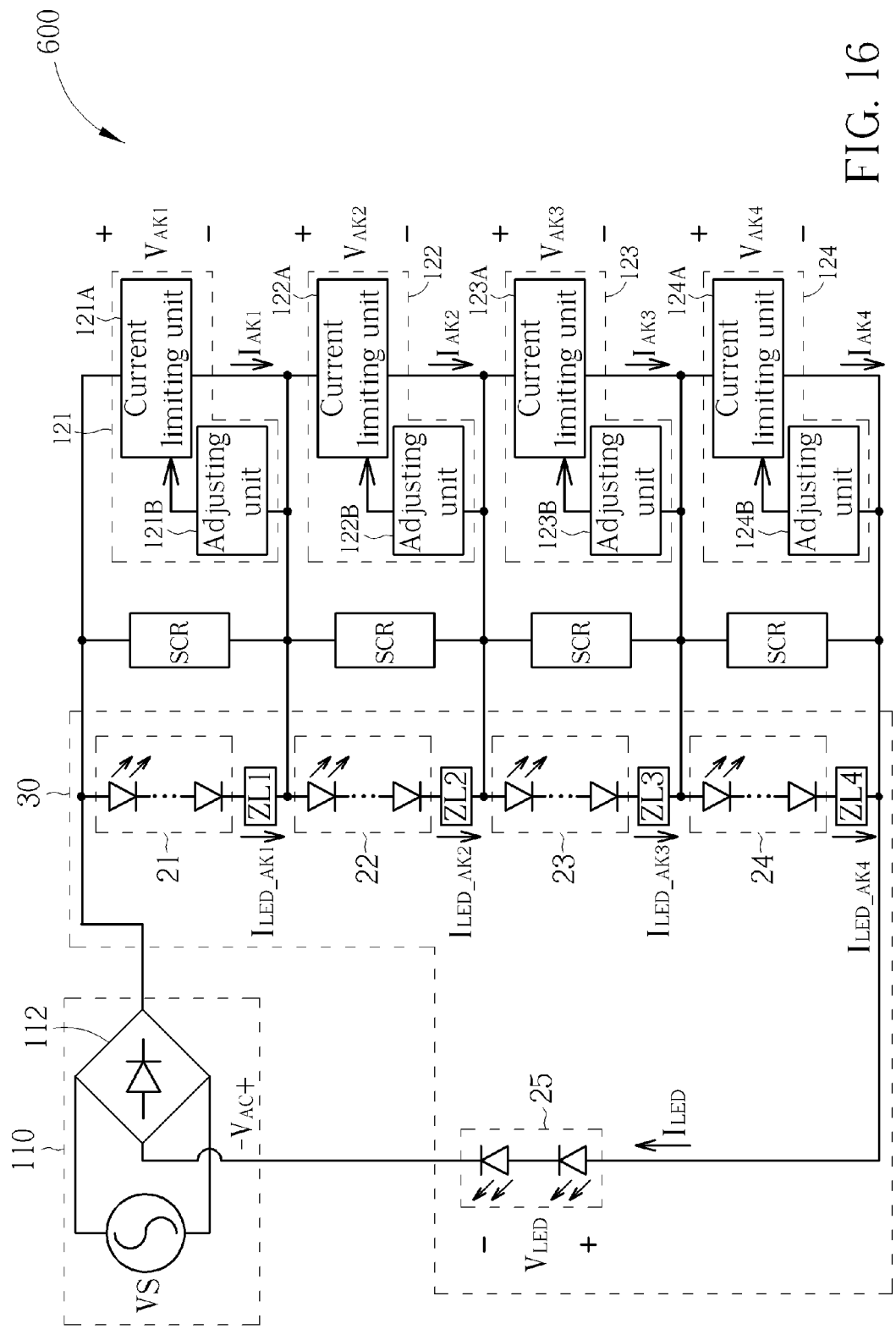
Figure 17:
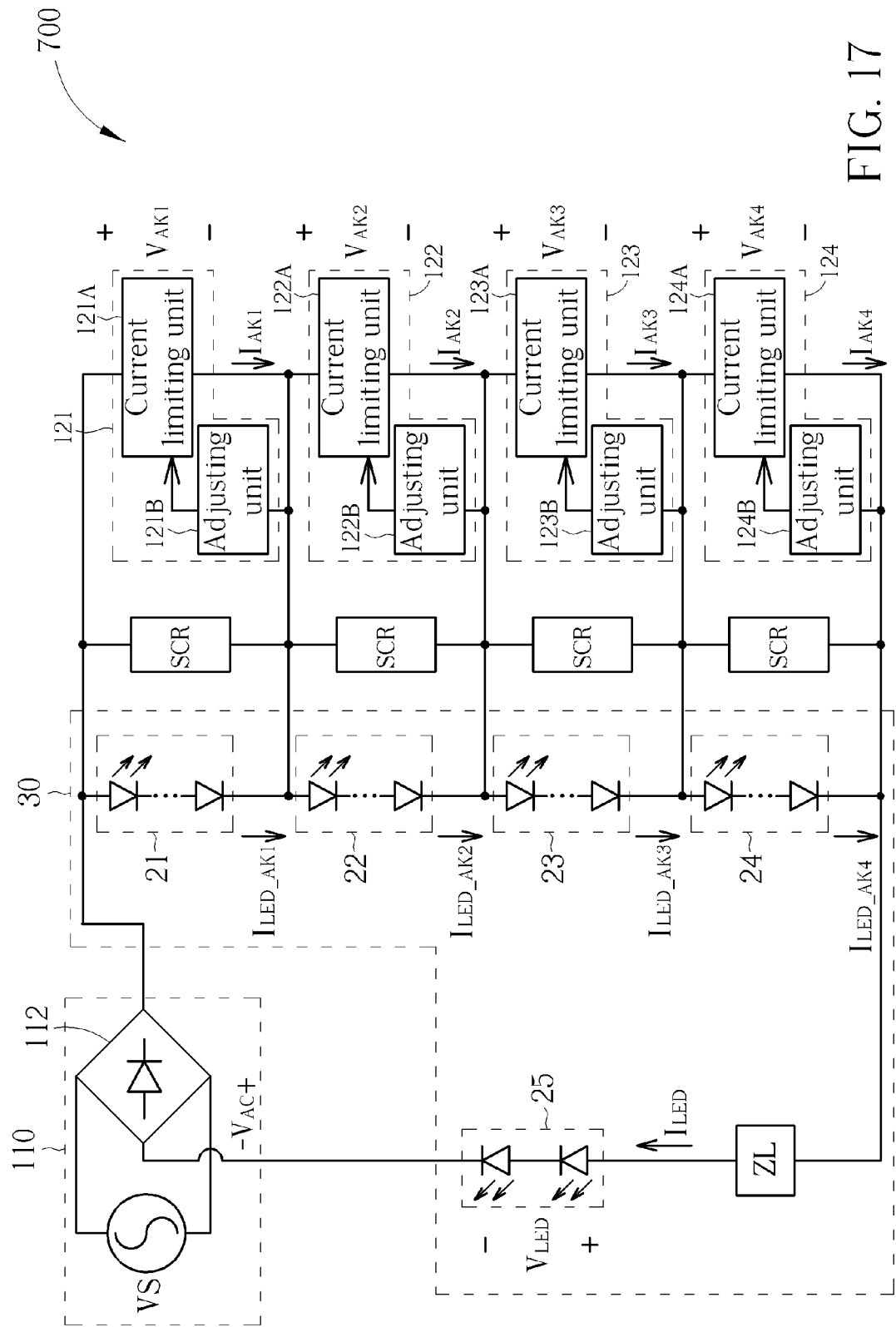
Figure 18:
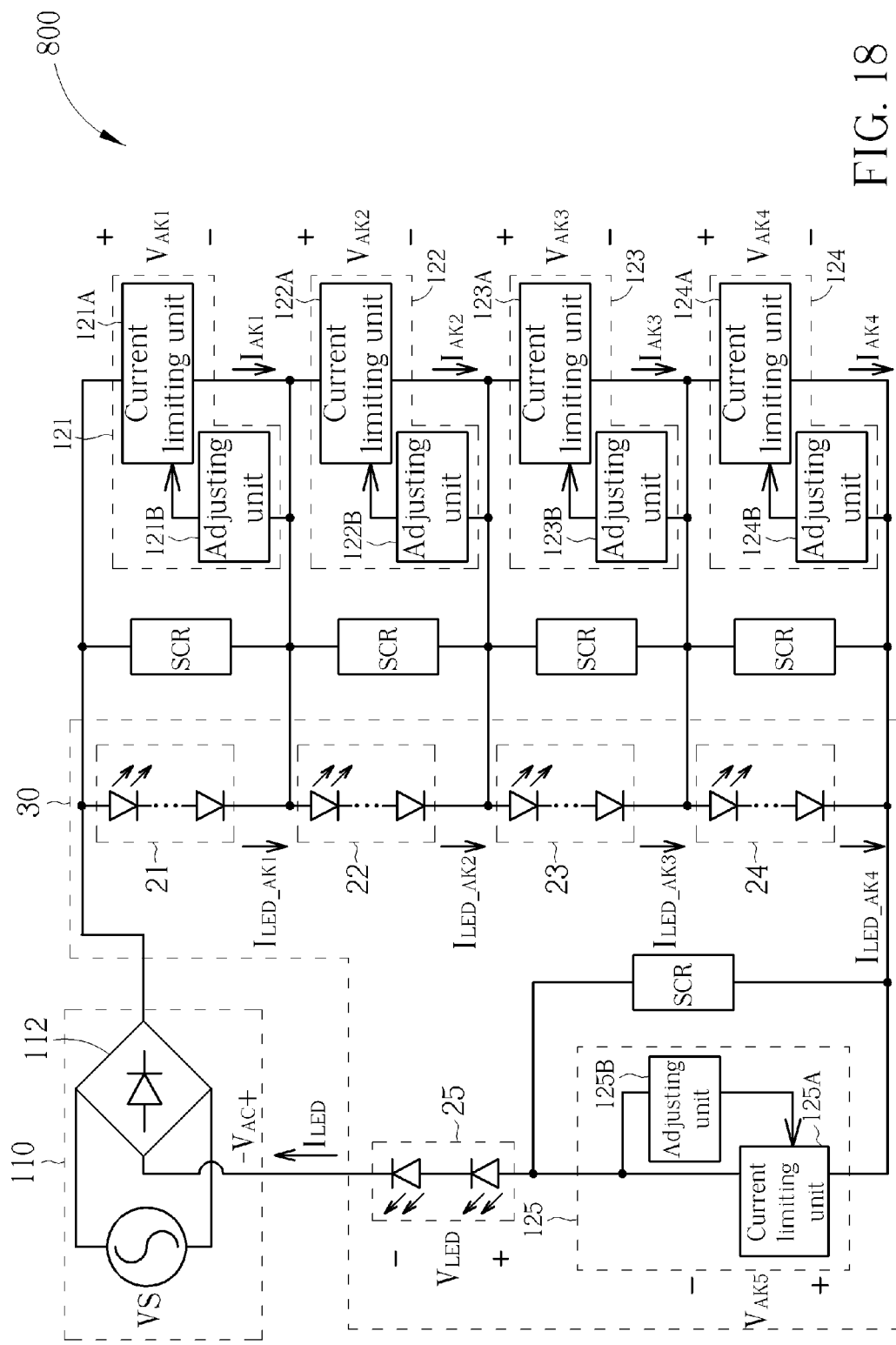
Figure 19A:
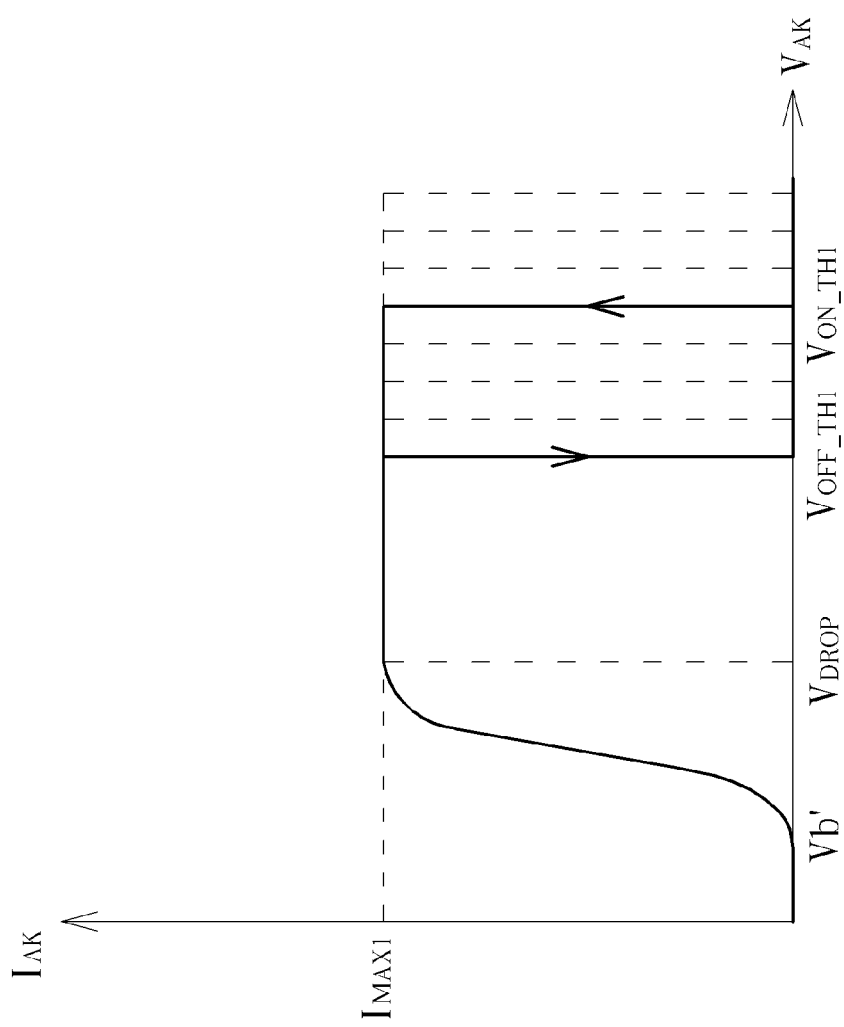
Figure 19B:
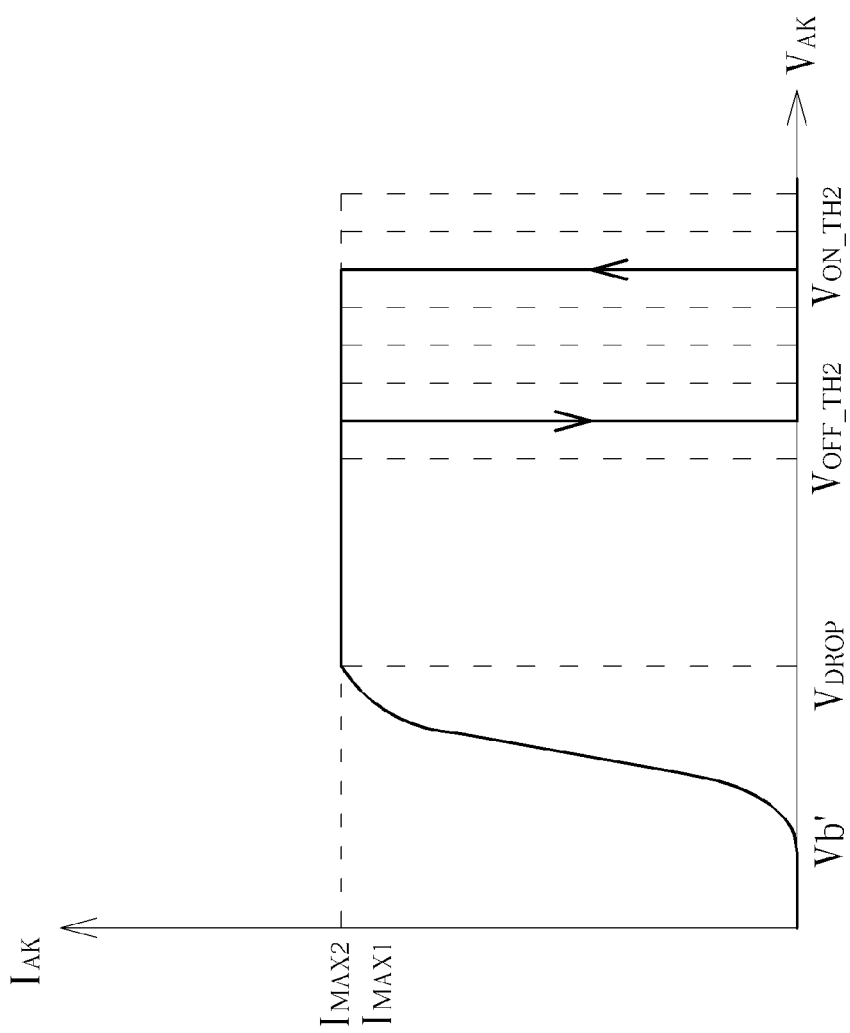
Figure 19C:
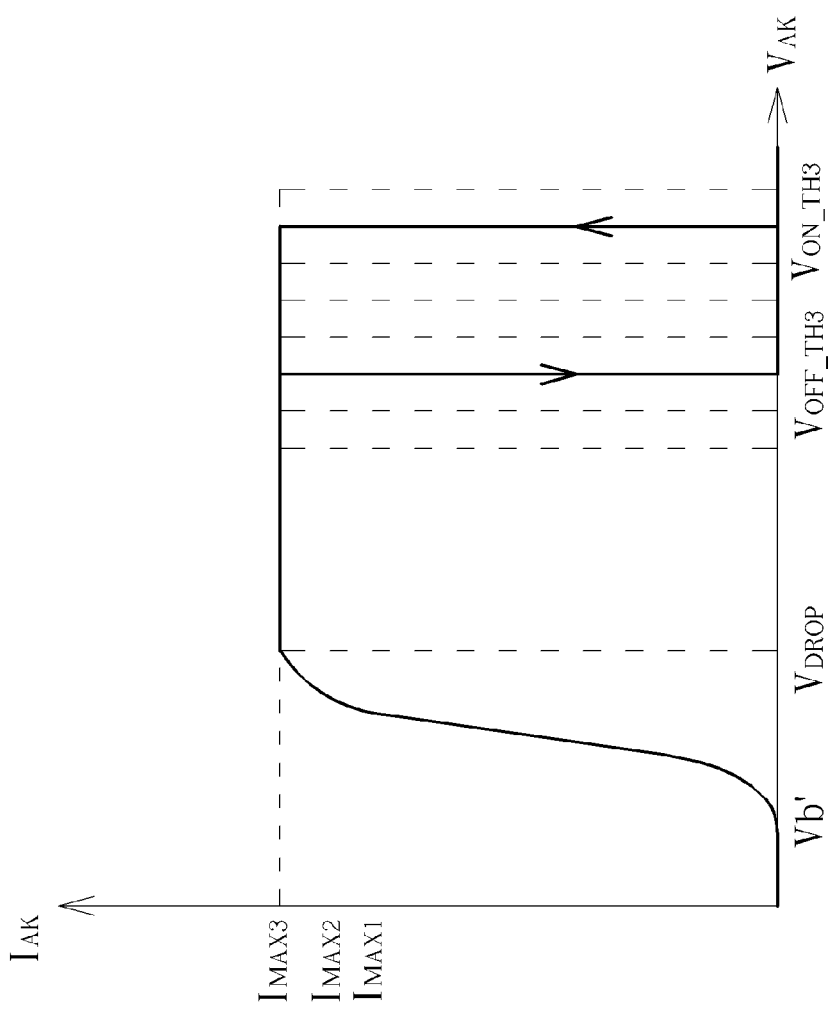
Figure 19D:
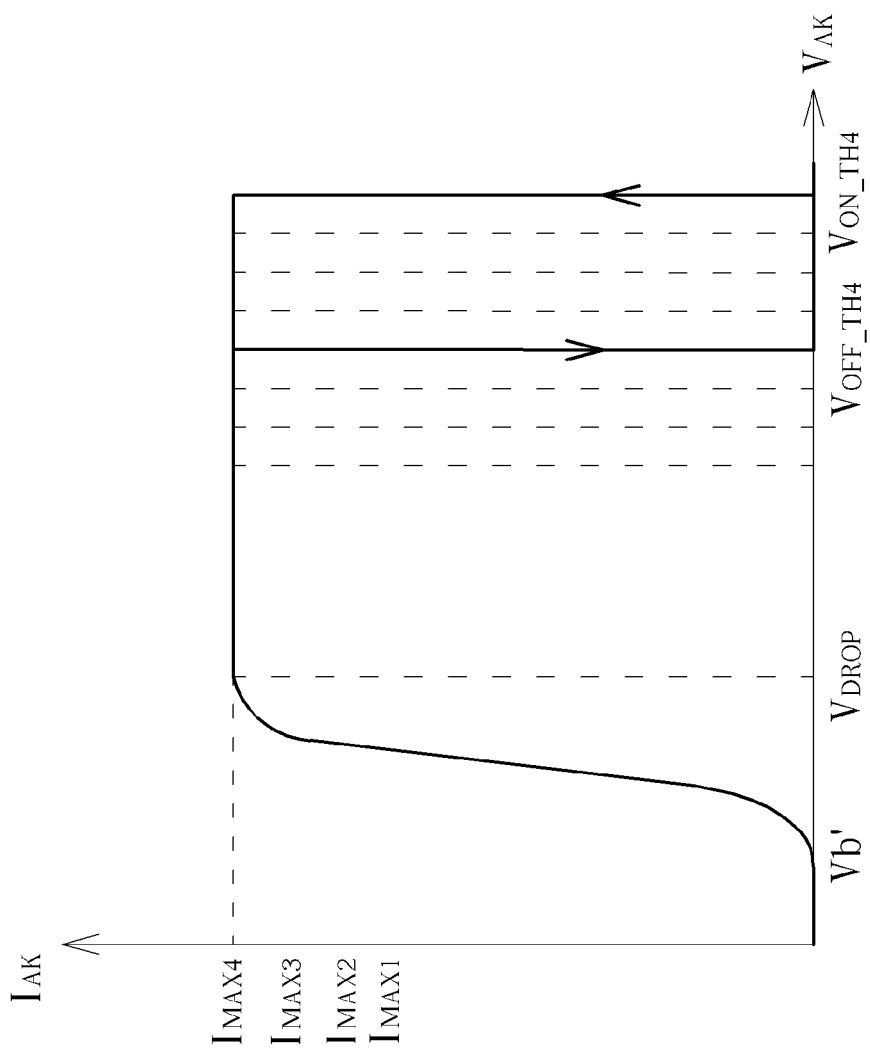

FIG. 15 is a diagram of an LED lighting device 500 according to a fifth embodiment of the present invention. FIG. 16 is a diagram of an LED lighting device 600 according to a sixth embodiment of the present invention. FIG. 17 is a diagram of an LED lighting device 700 according to a seventh embodiment of the present invention. FIG. 18 is a diagram of an LED lighting device 800 according to an eighth embodiment of the present invention. Each of the LED lighting devices 500, 600, 700 and 800 includes a power supply circuit 110, a plurality of two-terminal current controllers, a plurality of luminescent devices, a plurality of silicon-controlled rectifiers SCR, and at least one impedance device. Each silicon-controlled rectifier SCR, coupled in parallel to a corresponding luminescent device and a corresponding two-terminal current controller, is configured to provide ESD protection to the corresponding two-terminal current controller and provide open-circuit protection to the corresponding luminescent device.

In the fifth embodiment of the present invention depicted in FIG. 15, the LED lighting device 500 includes 4 two-terminal current controllers 121-124, 4 luminescent devices 21-23, 25, 4 silicon-controlled rectifiers SCR, and an impedance device ZL. The luminescent devices 21-23, respectively coupled in parallel to the corresponding two-terminal current controllers 121-123, each include a plurality of light-emitting units coupled in series, wherein $I_{LED\_AK1}$-$I_{LED\_AK3}$ respectively represent the currents flowing through the luminescent devices 21-23 and $V_{AK1}$-$V_{AK3}$ respectively represent the voltages established across the luminescent devices 21-23. The impedance device ZL is coupled in parallel to the corresponding two-terminal current controller 124, wherein $I_{LED\_AK4}$ represents the current flowing through the impedance device ZL and $V_{AK4}$ represents the voltage established across the impedance device ZL. The impedance device ZL may include a resistor, a capacitor, any device providing a resistive path, or any combination thereof. For example, the impedance device ZL may be implemented as a constant current source/sink integrated circuit (IC) whose structure and I-V curves are as depicted in FIGS. 24 and 25. The luminescent device 25, coupled in series to the two-terminal current controllers 121-124, includes a plurality of light-emitting units coupled in series, wherein $I_{LED}$ represents the current flowing through the luminescent device 25 and $V_{LED}$ represents the voltage established across the luminescent device 25. Each light-emitting unit may include a single light-emitting diode or multiple light-emitting diodes, and FIG. 15 depicts the embodiment using a single light-emitting diode. In the embodiment shown in FIG. 15, the two-terminal current controllers 121-124, each including corresponding current limiting units 121A-124A and corresponding adjusting units 121B-124B, are configured to regulate the currents passing through the corresponding luminescent elements 21-23 and the impedance device ZL according to the voltages $V_{AK1}$-$V_{AK4}$, respectively, wherein $I_{AK1}$-$I_{AK4}$ respectively represent the currents flowing through the two-terminal current controllers 121-124. The barrier voltages of the two-terminal current controllers 121-123 are smaller than the overall barrier voltages of the corresponding luminescent elements 21-23. If the power supply circuit 110 somehow fluctuates and the rectified AC voltage $V_{AC}$ is raised above its upper design limit, the impedance device ZL may provide overvoltage protection to the luminescent devices 21-23 and 25.

In the sixth embodiment of the present invention depicted in FIG. 16, the LED lighting device 600 includes 4 two-terminal current controllers 121-124, 5 luminescent devices 21-25, 4 silicon-controlled rectifiers SCR, and 4 impedance devices ZL1-ZL4. The luminescent devices 21-24, respectively coupled in series to the corresponding impedance devices ZL1-ZL4 and respectively coupled in parallel to the corresponding two-terminal current controllers 121-124, each include a plurality of light-emitting units coupled in series, wherein $I_{LED\_AK1}$-$I_{LED\_AK4}$ respectively represent the currents flowing through the luminescent devices 21-24 and $V_{AK1}$-$V_{AK4}$ respectively represent the voltages established across the two-terminal current controllers 121-124. Each of the impedance devices ZL1-ZL4 may include a resistor, a capacitor, any device providing a resistive path, or any combination thereof. For example, each of the impedance devices ZL1-ZL4 may be implemented as a constant current source/sink integrated circuit (IC) whose structure and I-V curves are as depicted in FIGS. 24 and 25. The luminescent device 25, coupled in series to the two-terminal current controllers 121-124, includes a plurality of light-emitting units coupled in series, wherein $I_{LED}$ represents the current flowing through the luminescent device 25 and $V_{LED}$ represents the voltage established across the luminescent device 25. Each light-emitting unit may include a single light-emitting diode or multiple light-emitting diodes, and FIG. 16 depicts the embodiment using a single light-emitting diode. In the embodiment shown in FIG. 16, the two-terminal current controllers 121-124, each including corresponding current limiting units 121A-124A and corresponding adjusting units 121B-124B, are configured to regulate the currents passing through the corresponding luminescent devices 21-24 according to the voltages $V_{AK1}$-$V_{AK4}$/respectively, wherein $I_{AK1}$-$I_{AK4}$ respectively represent the currents flowing through the two-terminal current controllers 121-124. The barrier voltages of the two-terminal current controllers 121-124 are smaller than the overall barrier voltages of the corresponding luminescent devices 21-24 and the impedance devices ZL1-ZL4. If the power supply circuit 110 somehow fluctuates and the rectified AC voltage $V_{AC}$ is raised above its upper design limit, the impedance devices ZL1-ZL4 may provide overvoltage protection to the luminescent devices 21-25. Meanwhile, the impedance devices ZL1-ZL4 may provide current paths of different resistances so that the luminescent devices 21-24 may be turned on in different sequences.

In the seventh embodiment of the present invention depicted in FIG. 17, the LED lighting device 700 includes 4 two-terminal current controllers 121-124, 5 luminescent devices 21-25, 4 silicon-controlled rectifiers SCR, and one impedance device ZL. The luminescent devices 21-24, respectively coupled in parallel to the corresponding two-terminal current controllers 121-124, each include a plurality of light-emitting units coupled in series, wherein $I_{LED\_AK1}$-$I_{LED\_AK4}$ respectively represent the currents flowing through the luminescent devices 21-24 and $V_{AK1}$-$V_{AK4}$ respectively represent the voltages established across the luminescent devices 21-24. The impedance device ZL, coupled in series to the luminescent devices 21-25, may include a resistor, a capacitor, any device providing a resistive path, or any combination thereof. For example, the impedance device ZL may be implemented as a constant current source/sink integrated circuit (IC) whose structure and I-V curves are as depicted in FIGS. 24 and 25. The luminescent device 25, coupled in series to the two-terminal current controllers 121-124, includes a plurality of light-emitting units coupled in series, wherein $I_{LED}$ represents the current flowing through the luminescent device 25 and $V_{LED}$ represents the voltage established across the luminescent device 25. Each light-emitting unit may include a single light-emitting diode or multiple light-emitting diodes, and FIG. 17 depicts the embodiment using a single light-emitting diode. In the embodiment shown in FIG. 17, the two-terminal current controllers 121-124, each including current limiting units 121A-124A and corresponding adjusting units 121B-124B, are configured to regulate the currents passing through the corresponding luminescent element devices 21-24 according to the voltages $V_{AK1}$-$V_{AK4}$, respectively, wherein $I_{AK1}$-$I_{AK4}$ respectively represent the currents flowing through the two-terminal current controllers 121-124. The barrier voltages of the two-terminal current controllers 121-124 are smaller than the overall barrier voltages of the corresponding luminescent devices 21-24. If the power supply circuit 110 somehow fluctuates and the rectified AC voltage $V_{AC}$ is raised above its upper design limit, the impedance device ZL may provide overvoltage protection to the luminescent devices 21-25.

In the eighth embodiment of the present invention depicted in FIG. 18, the LED lighting device 800 includes 5 two-terminal current controllers 121-125, 5 luminescent devices 21-25, and 5 silicon-controlled rectifiers SCR. The luminescent devices 21-24, respectively coupled in parallel to the corresponding two-terminal current controllers 121-124, each include a plurality of light-emitting units coupled in series, wherein $I_{LED\_AK1}$-$I_{LED\_AK4}$ respectively represent the currents flowing through the luminescent devices 21-24 and $V_{AK1}$-$V_{AK4}$ respectively represent the voltages established across the luminescent devices 21-24. The two-terminal current controller 125, coupled in series to the luminescent devices 21-25, may function as an impedance device (or a current regulator). The luminescent device 25, coupled in series to the two-terminal current controllers 121-125, includes a plurality of light-emitting units coupled in series, wherein $I_{LED}$ represents the current flowing through the luminescent device 25 and $V_{LED}$ represents the voltage established across the luminescent device 25. Each light-emitting unit may include a single light-emitting diode or multiple light-emitting diodes, and FIG. 18 depicts the embodiment using a single light-emitting diode. In the embodiment shown in FIG. 18, the two-terminal current controllers 121-125, each including corresponding current limiting units 121A-125A and corresponding adjusting units 121B-125B, are configured to regulate the currents passing through the corresponding luminescent element devices 21-24 according to the voltages $V_{AK1}$-$V_{AK4}$, respectively, wherein $I_{AK1}$-$I_{AK4}$ respectively represent the currents flowing through the two-terminal current controllers 121-124. The barrier voltages of the two-terminal current controllers 121-124 are smaller than the overall barrier voltages of the corresponding luminescent devices 21-24. If the power supply circuit 110 somehow fluctuates and the rectified AC voltage $V_{AC}$ is raised above its upper design limit, the two-terminal current controller 125 may function as a current regulator to clamp the current at a predetermined value, thereby capable of absorbing the redundant voltage to provide overvoltage protection to the luminescent devices 21-25.

Figure 20:
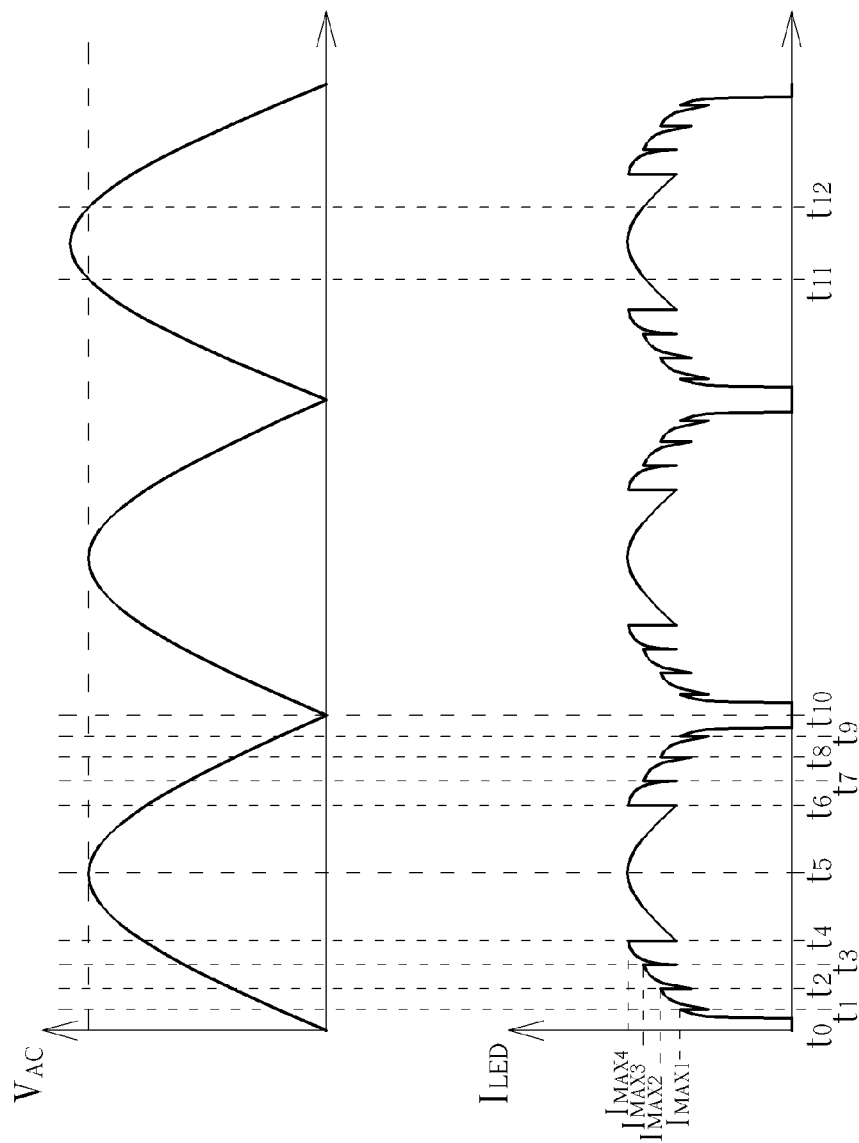

FIGS. 19A-19D and 20 illustrate the operation of the LED lighting devices 500, 600, 700 and 800, wherein FIG. 19A-19D are diagrams illustrating the current-voltage charts of the current limiting units 121A-124A, and FIG. 20 is a diagram illustrating the variations in the related current and voltage when operating the LED lighting devices 500, 600, 700 and 800. The adjusting units 121B-124B may provide flexible designs with various characteristics by adjusting the value of $I_{MAX}{'}$ when the two-terminal current controllers 121-124 operate in the second mode and the values of $V_{ON\_TH}$ and $V_{OFF\_TH}$ for switching between the second mode and the third mode. In the embodiment illustrated in FIGS. 19A-19D, $I_{MAX1} < I_{MAX2} < I_{MAX3} < I_{MAX4}$, $V_{ON\_TH1} < V_{ON\_TH2} < V_{ON\_TH3} < V_{ON\_TH4}$, and $V_{OFF\_TH1} < V_{OFF\_TH2} < V_{OFF\_TH3} < V_{OFF\_TH4}$.

FIG. 20 illustrates the waveforms of the voltage $V_{AC}$ and the current $I_{LED}$ when operating the LED lighting device 500, 600, 700 and 800. Since the value of the rectified AC voltage $V_{AC}$ varies periodically with time, a cycle between $t_0$-$t_{10}$ is used for illustration, wherein the period between $t_0$-$t_5$ is the rising period of the rectified AC voltage $V_{AC}$ and the period between $t_5$-$t_{10}$ is the falling period of the rectified AC voltage $V_{AC}$.

The operation of the LED lighting device 500, 600, 700 and 800 during the rising period $t_0$-$t_5$ is hereby explained. Between $t_0$-$t_1$ when the voltages $V_{AK1}$-$V_{AK4}$ increase with the rectified AC voltage $V_{AC}$, the two-terminal current controllers 121-124 are turned on earlier due to smaller barrier voltages, and the current flows from the power supply circuit 110 to the luminescent device 25 sequentially via the current limiting units 121A-124A (i.e., $I_{LED} = I_{AK1} = I_{AK2} = I_{AK3} = I_{AK4}$ and $I_{LED\_AK1} = I_{LED\_AK2} = I_{LED\_AK3} = I_{LED\_AK4} = 0$). Between $t_1$-$t_2$ when the voltage $V_{AK1}$ is larger than the voltage $V_{OFF\_TH1}$, the two-terminal current controller 121 is turned off first, and the current flows from the power supply circuit 110 to the luminescent device 25 sequentially via the luminescent device 21 and the current limiting units 122A-124A (i.e., $I_{LED}=I_{LED\_AK1}=I_{AK2}=I_{AK3}=I_{AK4}$ and $I_{AK1}=I_{LED\_AK2}=I_{LED\_AK3}=I_{LED\_AK4}=0$). Between $t_2$-$t_3$ when the voltage $V_{AK2}$ is larger than the voltage $V_{OFF\_TH2}$, the two-terminal current controller 122 is turned off next, and the current flows from the power supply circuit 110 to the luminescent device 25 sequentially via the luminescent device 22, the luminescent device 22 and the current limiting units 123A-124A (i.e., $I_{LED}=I_{LED\_AK1}=I_{LED\_AK2}=I_{AK3}=I_{AK4}$ and $I_{AK1}=I_{AK2}=I_{LED\_AK3}=I_{LED\_AK4}=0$). Between $t_3$-$t_4$ when the voltage $V_{AK3}$ is larger than the voltage $V_{OFF\_TH3}$, the two-terminal current controller 123 is turned off next, and the current flows from the power supply circuit 110 to the luminescent device 25 sequentially via the luminescent device 21, the luminescent device 22, the luminescent device 23 and the current limiting unit 124A (i.e., $I_{LED}=I_{LED\_AK1}=I_{LED\_AK2}=I_{LED\_AK3}=I_{AK4}$ and $I_{AK1}=I_{AK2}=I_{AK3}=I_{LED\_AK4}=0$). Between $t_4$-$t_5$ when the voltage $V_{AK4}$ is larger than the voltage $V_{OFF\_TH4}$ the two-terminal current controller 124 is turned off next, and the current flows from the power supply circuit 110 to the luminescent device 25 sequentially via the luminescent devices 21-24 (i.e., $I_{LED}=I_{LED\_AK1}=I_{LED\_AK2}=I_{LED\_AK3}=I_{LED\_AK4}$ and $I_{AK1}=I_{AK2}=I_{AK3}=I_{AK4}=0$). During the falling period $t_5$-$t_{10}$ when the voltages $V_{AK4}$, $V_{AK3}$, $V_{AK2}$ and $V_{AK1}$ sequentially drop below $V_{ON\_TH4}'$, $V_{ON\_TH3}'$, $V_{ON\_TH2}'$ and $V_{ON\_TH1}'$, respectively, the current limiting units 124A-121A are sequentially turned on at $t_6$-$t_9$, respectively. The operation of the LED lighting device 300 during the falling period $t_5$-$t_{10}$ is similar to that during the corresponding rising period $t_0$-$t_5$ as previously illustrated. In other words, during the same period, the luminescent device 25 has the longest conducting time, the luminescent device 21 has the second longest conducting time and the luminescent device 24 has the shortest conducting time. In many applications, the luminescent elements 21-24 may be required to provide different luminescence or become luminescent at different time. The present invention may thus provide flexible designs using the adjusting units 121B-124B.

Figure 21:
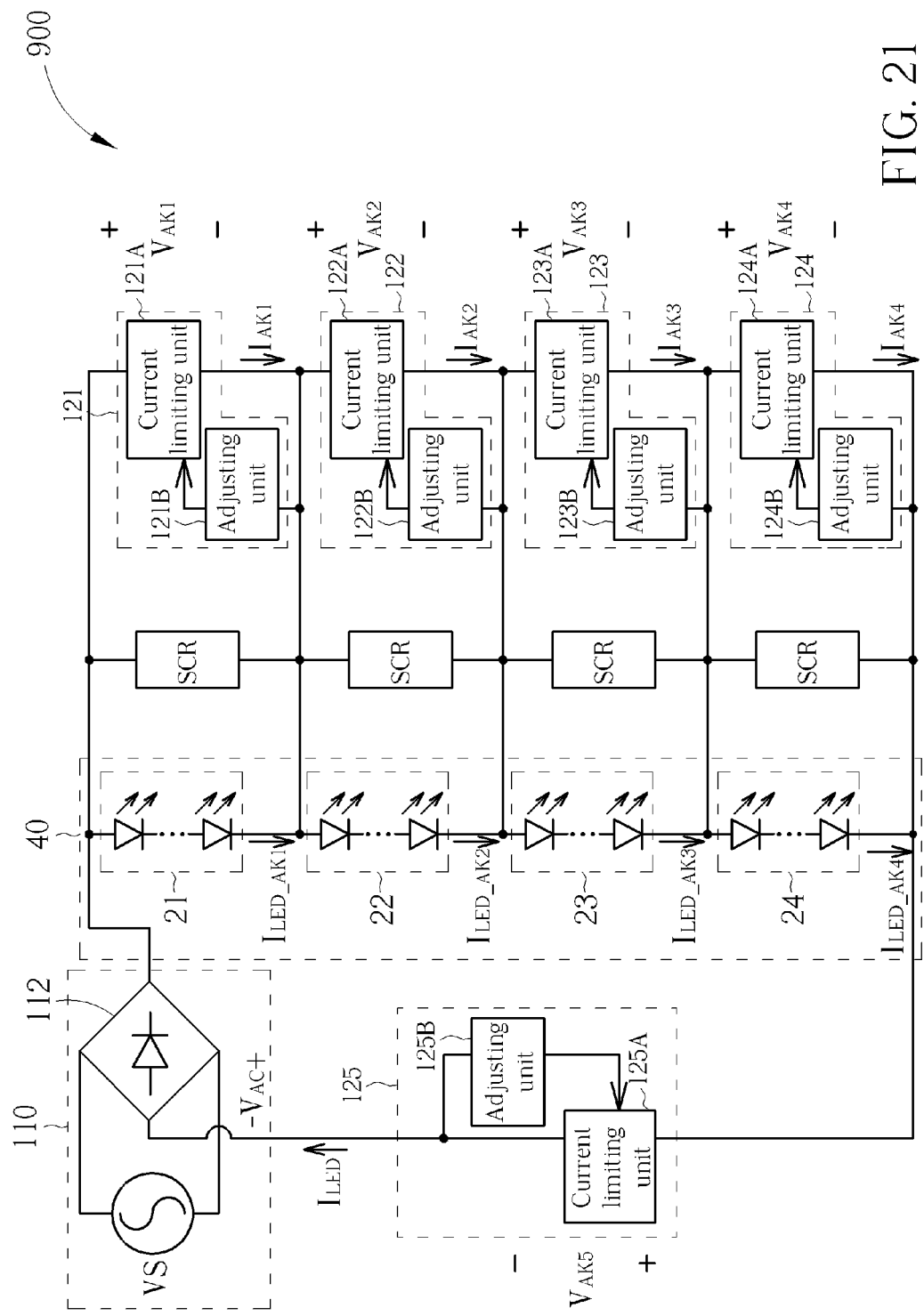

FIG. 21 is a diagram of an LED lighting device 900 according to a ninth embodiment of the present invention. The LED lighting devices 900 includes a power supply circuit 110, 5 two-terminal current controllers 121-125, 4 luminescent devices 21-24, and 4 silicon-controlled rectifiers SCR. The luminescent devices 21-24, respectively coupled in parallel to the corresponding two-terminal current controllers 121-124, each include a plurality of light-emitting units coupled in series, wherein $I_{LED\_AK1}$-$I_{LED\_AK4}$ respectively represent the currents flowing through the luminescent devices 21-24 and $V_{AK1}$-$V_{AK4}$ respectively represent the voltages established across the luminescent devices 21-24. Each light-emitting unit may include a single light-emitting diode or multiple light-emitting diodes, and FIG. 21 depicts the embodiment using a single light-emitting diode. In the embodiment shown in FIG. 21, the two-terminal current controllers 121-124, each including corresponding current limiting units 121A-124A and corresponding adjusting units 121B-124B, are configured to regulate the currents passing through the corresponding luminescent devices 21-24 according to the voltages $V_{AK1}$-$V_{AK4}$, respectively, wherein $I_{AK1}$-$I_{AK4}$ respectively represent the currents flowing through the two-terminal current controllers 121-124. The barrier voltages of the two-terminal current controllers 121-124 are smaller than the overall barrier voltages of the corresponding luminescent elements 21-24. The two-terminal current controller 125, coupled in series to the two-terminal current controllers 121-124 and including a current limiting unit 125A and an adjusting unit 125B, is configured to regulate the current $I_{LED}$ according to the voltage $V_{AK5}$. If the power supply circuit 110 somehow fluctuates and the rectified AC voltage $V_{AC}$ is raised above its upper design limit, the two-terminal current controller 125 may function as a current limiting device which provides constant current control to the luminescent devices 21-24. Each silicon-controlled rectifier SCR, coupled in parallel to a corresponding luminescent device and a corresponding two-terminal current controller, is configured to provide ESD protection to the corresponding two-terminal current controller and provide open-circuit protection to the corresponding luminescent device.

Figure 22:
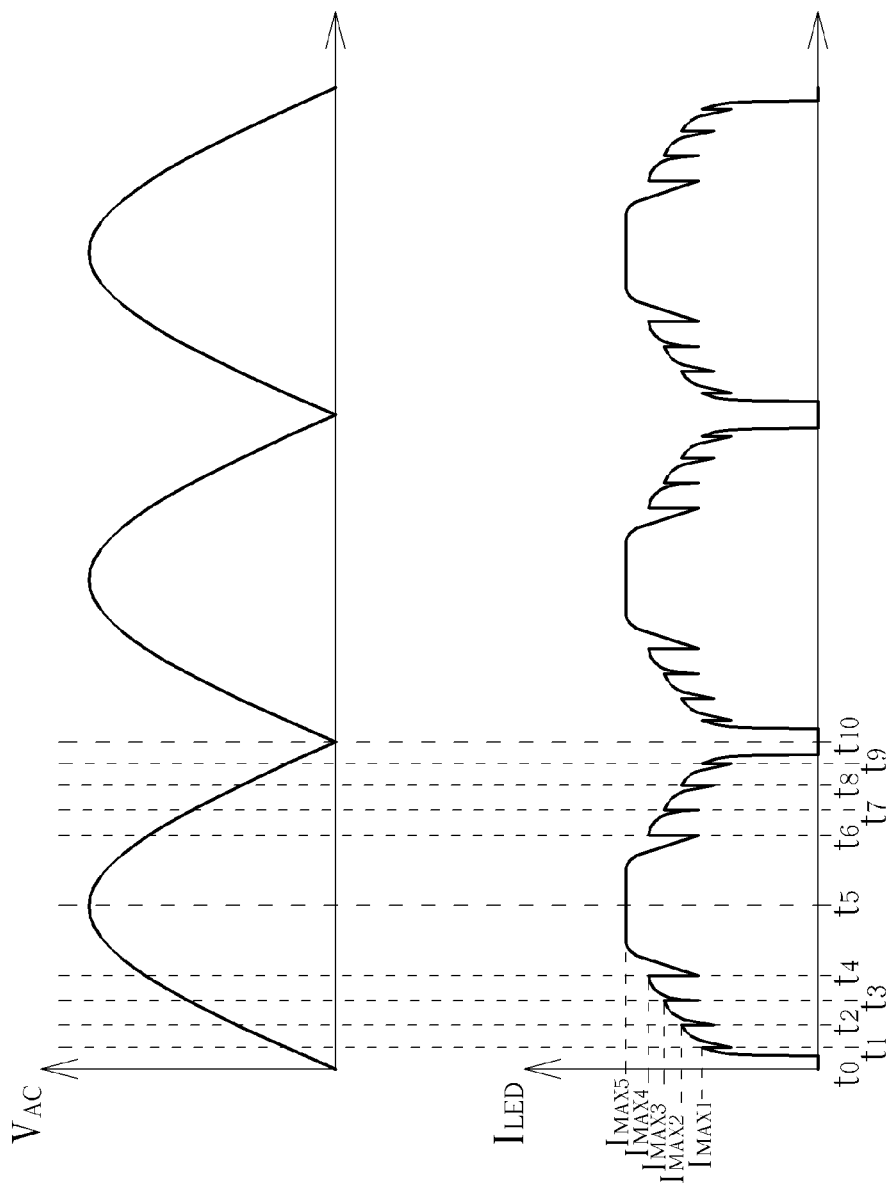

FIG. 22 shows the waveforms of the voltage and the current for illustrating the operation of the LED lighting device 900 according to the ninth embodiment of the present invention. As previously illustrated, the two-terminal current controllers 121-124 are turned off during $t_4$-$t_6$, and the current $I_{LED}$ passing through the luminescent elements 21-24 is determined by the rectified AC voltage $V_{AC}$ provided by the power supply circuit 110. In the LED lighting device 900 according to the ninth embodiment of the present invention, the two-terminal current controller 125 is configured to maintain the current $I_{LED}$ to a specific value $I_{MAX5}$ which may be adjusted in various applications. The relationship between $I_{MAX1}$-$I_{MAX5}$ depicted in FIG. 22 is only for illustrative purpose, and does not limit the scope of the present invention.

Figure 23:
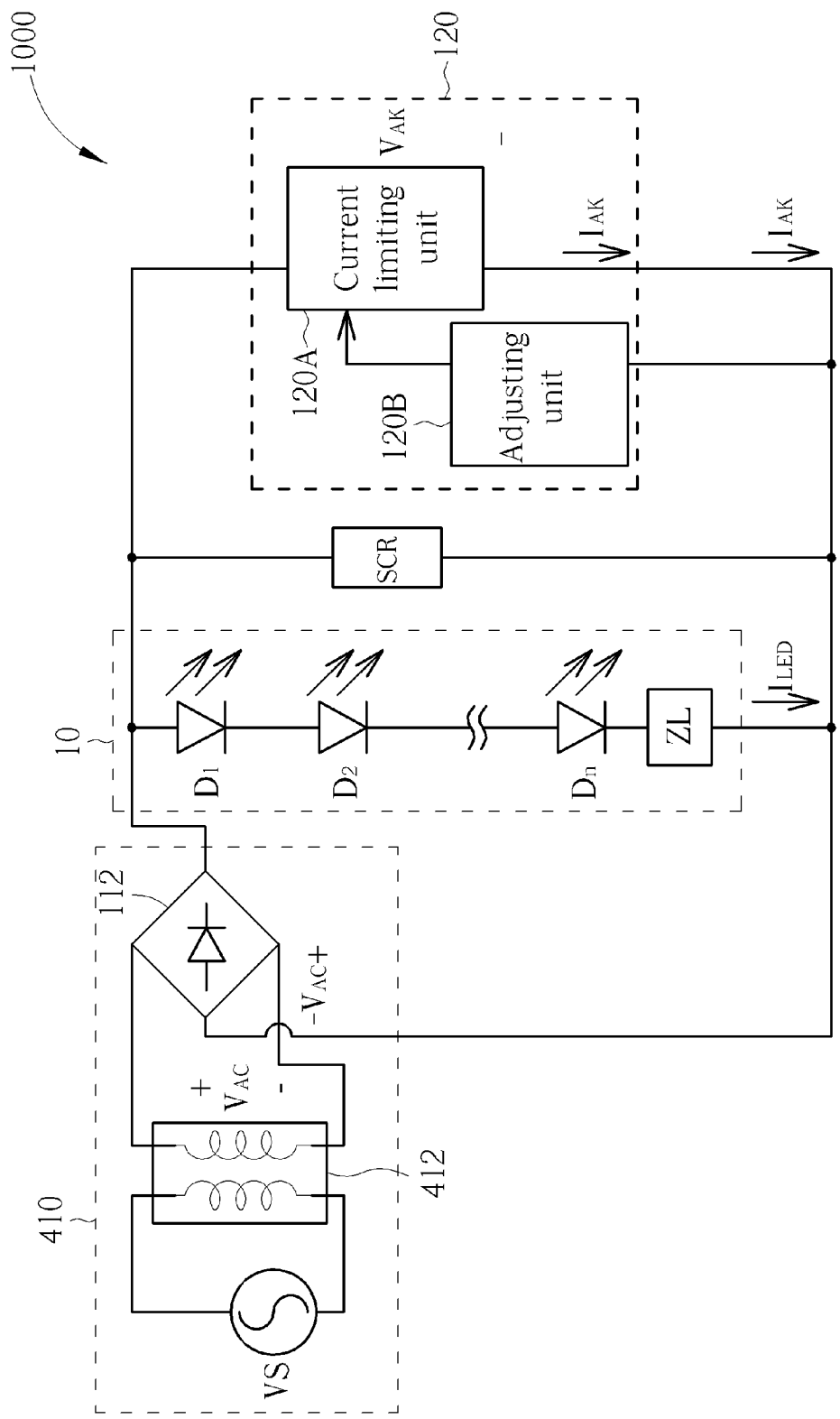

FIG. 23 is a diagram of an LED lighting device 1000 according to a tenth embodiment of the present invention. The LED lighting device 1000 includes a power supply circuit 410, a two-terminal current controller 120, a luminescent device 10, a silicon-controlled rectifier SCR, and an impedance device ZL. Having similar structures, the first and tenth embodiments of the present invention differ in the power supply circuits. In the first embodiment of the present invention, the power supply circuit 110 is configured to rectify the AC voltage VS (such as 110-220V main) using the bridge rectifier 112, thereby providing the rectified AC voltage $V_{AC}$ whose value varies periodically with time. In the tenth embodiment of the present invention, the power supply circuit 410 is configured to receive any AC voltage VS, perform voltage conversion using an AC-AC converter 412, and rectify the converted AC voltage VS using the bridge rectifier 112, thereby providing the rectified AC voltage $V_{AC}$ whose value varies periodically with time. References may be also be made to FIGS. 6-8 for illustrating the operation of the LED lighting device 1000. Similarly, the second to ninth embodiments of the present invention may also use the power supply circuit 410 for providing the rectified AC voltage $V_{AC}$.

In the LED lighting devices of the present invention, the number of the two-terminal current controllers 120-125, the number and configuration of the luminescent elements 21-25, and the type of the power supply circuits 110 and 410 may be determined according to different applications. FIGS. 4-5, 9-10, 15-18, 21 and 23 are merely for illustrative purpose and do not limit the scope of the present invention. Also, the two-terminal current controller 120 depicted in FIGS. 11-12 is an embodiment of the present invention and may be substituted by devices which are able to provide characteristics as shown in FIGS. 6-8, 13 and 19A-19D.

The LED lighting device of the present invention regulates the current flowing through the serially-coupled light-emitting diodes and controls the number of the turned-on light-emitting diodes using a two-terminal current controller. Some of the light-emitting diodes may be conducted before the rectified AC voltage reaches the overall barrier voltage of all light-emitting diodes for improving the power factor. Meanwhile, the silicon-controlled rectifier may provide ESD protection to the corresponding two-terminal current controller and provide open-circuit protection to the corresponding luminescent device. Therefore, the present invention may provide lighting devices having large effective operational voltage range, high brightness and overvoltage protection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A two-terminal current controller for controlling a first current passing through a load, wherein:
   during a rising period of a rectified alternative-current (AC) voltage when a voltage established across the load does not exceed a first voltage, the two-terminal current controller operates in a first mode;
   during the rising period when the voltage established across the load exceeds the first voltage but does not exceed a second voltage, the two-terminal current controller operates in a second mode; and
   during the rising period when the voltage established across the load exceeds the second voltage, the two-terminal current controller operates in a third mode;
   during the rising period when the voltage established across the load drops to a third voltage smaller than the second voltage after exceeding the second voltage, the two-terminal current controller is configured to:
      operate in the second mode when a difference between the second and third voltages exceeds a first hysteresis band; and
      operate in the third mode when a difference between the second and third voltages does not exceed the first hysteresis band; and
   the two-terminal current controller includes:
      a current limiting unit configured to:
         conduct a second current associated with the rectified AC voltage, regulate the second current according to the voltage established across the load and maintain the first current at zero when the two-terminal current controller operates in the first mode;
         conduct the second current, maintain the second current at a predetermined value larger than zero and maintain the first current at zero when the two-terminal current controller operates in the second mode; and
         switch off when the two-terminal current controller operates in the third mode; and
      an adjusting unit configured to adjust the predetermined value and the second voltage.

2. The two-terminal current controller of claim 1, wherein when the voltage established across the two-terminal current controller becomes smaller than a fourth voltage but is larger than the first voltage during a falling period of the rectified AC voltage, the two-terminal current controller operates in the second mode for maintaining the first current at substantially zero and setting the second current to the predetermined value, and the fourth voltage is larger than the second voltage.

3. The two-terminal current controller of claim 2, wherein when the voltage established across the two-terminal current controller becomes larger than a fifth voltage which is larger than the fourth voltage after becoming smaller than the fourth voltage during the falling period of the rectified AC voltage, the two-terminal current controller is configure to:
   operate in the third mode when a difference between the fourth and fifth voltages exceeds a second hysteresis band; and
   operate in the second mode when a difference between the fourth and fifth voltages does not exceed the second hysteresis band.

4. The two-terminal current controller of claim 3, wherein the current limiting unit comprises:
   a first switch configured to conduct the second current according to a control signal;
   a band-gap reference voltage generator configured to provide a band-gap reference voltage;
   a first voltage-dividing circuit configured to provide a first reference voltage and a second reference voltage by voltage-dividing the band-gap reference voltage;
   a second voltage-dividing circuit configured to provide a sixth voltage and a seventh voltage by voltage-dividing the rectified AC voltage;
   a current-detecting circuit coupled in series to the first switch and configured to detect the second current and provide a corresponding feedback voltage;
   a voltage edge-detecting circuit configured to determine whether the rectified AC voltage is during the rising period or the falling period;
   a comparator configured to provide the control signal according to a relationship between the first reference voltage and the feedback voltage, the second voltage, the fourth voltage and a determining result of the voltage edge-detecting circuit;
   a first hysteresis comparator configured to provide the fourth voltage according to a relationship between the second reference voltage and the sixth voltage; and
   a second hysteresis comparator configured to provide the second voltage according to a relationship between the second reference voltage and the seventh voltage.

5. The two-terminal current controller of claim 4, wherein the adjusting unit includes:
   a resistor coupled in parallel with the first voltage-dividing circuit for adjusting the first reference voltage and the second reference voltage.

6. The two-terminal current controller of claim 4, wherein the adjusting unit includes:
   a resistor; and
   a fuse coupled in parallel with the resistor for coupling the resistor in parallel with the first voltage-dividing circuit when burned, thereby adjusting the first reference voltage and the second reference voltage.

7. The two-terminal current controller of claim 4, wherein the adjusting unit includes:
   a resistor; and
   a fuse coupled in series to the resistor for coupling the resistor in parallel with the first voltage-dividing circuit when unburned, thereby adjusting the first reference voltage and the second reference voltage.

8. The two-terminal current controller of claim 4 wherein the current-detecting circuit comprises:
   a resistor coupled to the first switch for providing the feedback voltage according to the second current; and
   a second switch coupled in parallel to the resistor for adjusting an effective impedance of the resistor.

9. The two-terminal current controller of claim 4, wherein:
   during the falling period when the voltage established across the load does not exceed the first voltage, the first switch is configured to regulate the second current according to the control signal; and
   during the falling period when the voltage established across the load exceeds the first voltage but does not exceed the fourth voltage, the first switch is configured to maintain the second current at the predetermined value according to the control signal and maintain the first current at zero.

10. The two-terminal current controller of claim 9, wherein the two-terminal current controller is configured to regulate the second current according to the voltage established across the load, so that a relationship between the voltage established across the load and the second current matches a characteristic when the first switch operates in a specific operational region.

11. The two-terminal current controller of claim 1, wherein the current limiting unit comprises:
a first switch configured to conduct the second current according to a control signal;
a band-gap reference voltage generator configured to provide a band-gap reference voltage;
a first voltage-dividing circuit configured to provide a first reference voltage and a second reference voltage by voltage-dividing the band-gap reference voltage;
a second voltage-dividing circuit configured to provide a fourth voltage by voltage-dividing the rectified AC voltage;
a current-detecting circuit coupled in series to the first switch and configured to detect the second current and provide a corresponding feedback voltage;
a voltage edge-detecting circuit configured to determine whether the rectified AC voltage is during the rising period or the falling period;
a first comparator configured to provide the control signal according to a relationship between the first reference voltage and the feedback voltage, the second voltage, the third voltage and a determining result of the voltage edge-detecting circuit; and
a second hysteresis comparator configured to provide the second voltage according to a relationship between the second reference voltage and the fourth voltage.

12. The two-terminal current controller of claim 11, wherein the adjusting unit includes:
a resistor; and
a fuse coupled in parallel with the resistor for coupling the resistor in parallel with the first voltage-dividing circuit when burned, thereby adjusting the first reference voltage and the second reference voltage.

13. The two-terminal current controller of claim 11, wherein the adjusting unit includes:
a resistor; and
a fuse coupled in series to the resistor for coupling the resistor in parallel with the first voltage-dividing circuit when unburned, thereby adjusting the first reference voltage and the second reference voltage.

14. The two-terminal current controller of claim 11 wherein the current-detecting circuit comprises:
a resistor coupled to the first switch for providing the feedback voltage according to the second current; and
a second switch coupled in parallel to the resistor for adjusting an effective impedance of the resistor.

15. The two-terminal current controller of claim 11, wherein:
during the rising period when the voltage established across the load does not exceed the first voltage, the switch is configured to regulate the second current according to the control signal; and
during the rising period when the voltage established across the load exceeds the first voltage, the switch is configured to maintain the second current at the predetermined value according to the control signal.

16. The two-terminal current controller of claim 1, wherein a barrier voltage for turning on the two-terminal current controller is smaller than a barrier voltage for turning on the load.

17. A light-emitting diode (LED) lighting device with over-voltage protection, comprising:
a first luminescent device for providing light according to a first current;
a second luminescent device coupled in series to the first luminescent device for providing light according to a second current;
a first impedance device for limiting the first current or the second current within a first predetermined range when a voltage established across the first luminescent device and the second luminescent device exceeds a first predetermined value;
a first two-terminal current controller coupled in parallel to the first luminescent device and in series to the second luminescent device and configured to regulate the second current according to a voltage established across the two-terminal current controller, wherein:
during a rising period of a rectified AC voltage when the voltage established across the two-terminal current controller does not exceed a first voltage, the first two-terminal current controller operates in a first mode;
during the rising period when the voltage established across the two-terminal current controller exceeds the first voltage but does not exceed a second voltage, the first two-terminal current controller operates in a second mode;
during the rising period when the voltage established across the two-terminal current controller exceeds the second voltage, the first two-terminal current controller operates in a third mode; and
the first two-terminal current controller includes:
a current limiting unit configured to:
conduct a third current associated with the rectified AC voltage, regulate the third current according to the voltage established across the first luminescent device and maintain the first current at zero when the first two-terminal current controller operates in the first mode;
conduct the third current, maintain the third current at a second predetermined value larger than zero and maintain the first current at zero when the first two-terminal current controller operates in the second mode; and
switch off for equalizing the first current and the second current when the first two-terminal current controller operates in the third mode; and
an adjusting unit configured to adjust the second predetermined value and the second voltage.

18. The LED lighting device of claim 17, wherein when the voltage established across the first two-terminal current controller is larger than the first voltage and does not exceed a third voltage during a falling period of the rectified AC voltage, the first two-terminal current controller is turned on for maintaining the first current at substantially zero and setting the second current and the third current to the second predetermined value, and the third voltage is larger than the second voltage.

19. The LED lighting device of claim 18, wherein the current limiting unit comprises:
a first switch configured to conduct the third current according to a control signal;
a band-gap reference voltage generator configured to provide a band-gap reference voltage;

a first voltage-dividing circuit configured to provide a first reference voltage and a second reference voltage by voltage-dividing the band-gap reference voltage;

a second voltage-dividing circuit configured to provide a fourth voltage and a fifth voltage by voltage-dividing the rectified AC voltage;

a current-detecting circuit coupled in series to the switch and configured to detect the third current and provide a corresponding feedback voltage;

a voltage edge-detecting circuit configured to determine whether the rectified AC voltage is during the rising period or the falling period;

a first comparator configured to provide the control signal according to a relationship between the first reference voltage and the feedback voltage, the second voltage, the third voltage and a determining result of the voltage edge-detecting circuit;

a second comparator configured to provide the second voltage according to a relationship between the second reference voltage and the fourth voltage; and a third comparator configured to provide the third voltage according to a relationship between the second reference voltage and the fifth voltage.

20. The LED lighting device of claim 19, wherein the adjusting unit includes:

a resistor coupled in parallel with the first voltage-dividing circuit for adjusting the first reference voltage and the second reference voltage.

21. The LED lighting device of claim 19, wherein the adjusting unit includes:

a resistor; and a fuse coupled in parallel with the resistor for coupling the resistor in parallel with the first voltage-dividing circuit when burned, thereby adjusting the first reference voltage and the second reference voltage.

22. The LED lighting device of claim 19, wherein the adjusting unit includes:

a resistor; and a fuse coupled in series to the resistor for coupling the resistor in parallel with the first voltage-dividing circuit when unburned, thereby adjusting the first reference voltage and the second reference voltage.

23. The LED lighting device of claim 19, wherein the current-detecting circuit comprises:

a resistor coupled to the first switch for providing the feedback voltage according to the third current; and a second switch coupled in parallel to the resistor for adjusting an effective impedance of the resistor.

24. The LED lighting device of claim 19, wherein:

during the falling period when the voltage established across the first two-terminal current controller does not exceed the first voltage, the first switch is configured to regulate the third current according to the control signal; and during the falling period when the voltage established across the first two-terminal current controller exceeds the first voltage but does not exceed the third voltage, the first switch is configured to maintain the third current at the second predetermined value according to the control signal and maintain the first current at zero.

25. The LED lighting device of claim 24, wherein the first two-terminal current controller is configured to regulate the third current according to the voltage established across the first luminescent device, so that a relationship between the voltage established across the first luminescent device and the second current matches a characteristic when the first switch operates in a specific operational region.

26. The LED lighting device of claim 17, wherein the current limiting unit comprises:

a first switch configured to conduct the third current according to a control signal;

a band-gap reference voltage generator configured to provide a band-gap reference voltage;

a first voltage-dividing circuit configured to provide a first reference voltage and a second reference voltage by voltage-dividing the band-gap reference voltage;

a second voltage-dividing circuit configured to provide a third voltage by voltage-dividing the rectified AC voltage;

a current-detecting circuit coupled in series to the first switch and configured to detect the third current and provide a corresponding feedback voltage;

a voltage edge-detecting circuit configured to determine whether the rectified AC voltage is during the rising period or the falling period;

a first comparator configured to provide the control signal according to a relationship between the first reference voltage and the feedback voltage, the second voltage and a determining result of the voltage edge-detecting circuit; and a second comparator configured to provide the second voltage according to a relationship between the second reference voltage and the third voltage.

27. The LED lighting device of claim 26, wherein the adjusting unit includes:

a resistor coupled in parallel with the first voltage-dividing circuit for adjusting the first reference voltage and the second reference voltage.

28. The LED lighting device of claim 26, wherein the adjusting unit includes:

a resistor; and a fuse coupled in parallel with the resistor for coupling the resistor in parallel with the first voltage-dividing circuit when burned, thereby adjusting the first reference voltage and the second reference voltage.

29. The LED lighting device of claim 26, wherein the adjusting unit includes:

a resistor; and a fuse coupled in series to the resistor for coupling the resistor in parallel with the first voltage-dividing circuit when unburned, thereby adjusting the first reference voltage and the second reference voltage.

30. The LED lighting device of claim 26, wherein the current-detecting circuit comprises:

a resistor coupled to the first switch for providing the feedback voltage according to the third current; and a second switch coupled in parallel to the resistor for adjusting an effective impedance of the resistor.

31. The LED lighting device of claim 26, wherein:

during the rising period when the voltage established across the first two-terminal current controller does not exceed the first voltage, the first switch is configured to regulate the third current according to the control signal; and during the rising period when the voltage established across the first two-terminal current controller exceeds the first voltage, the first switch is configured to maintain the third current at the second predetermined value according to the control signal.

32. The LED lighting device of claim 17, wherein a barrier voltage for turning on the two-terminal current controller is smaller than a barrier voltage for turning on the first luminescent device.

33. The LED lighting device of claim 17, wherein each luminescent device includes a plurality of LEDs coupled in series.

34. The LED lighting device of claim 17, wherein the first impedance device includes a resistor, capacitor, a constant current source integrated circuit, or a constant current sink integrated circuit.

35. The LED lighting device of claim 17, wherein the first impedance device is coupled in series to the first luminescent device and the second luminescent device.

36. The LED lighting device of claim 35 wherein the first two-terminal current controller is coupled in parallel to the serially-coupled first luminescent device and the first impedance device.

37. The LED lighting device of claim 35, further comprising:
 a second two-terminal current controller coupled in series to the first two-terminal current controller and the second luminescent device and configured to regulate the second current according to a voltage established across the second two-terminal current controller, wherein the first impedance device is coupled in parallel to the second two-terminal current controller.

38. The LED lighting device of claim 17, further comprising:
 a third luminescent device coupled in series to the first luminescent device and the second luminescent device for providing light according to a fourth current;
 a second two-terminal current controller coupled in parallel to the third luminescent device and in series to the first two-terminal current controller and the second luminescent device and configured to regulate the second current according to a voltage established across the second two-terminal current controller;
 a second impedance device for limiting the fourth current within a second predetermined range when a voltage established across the first to third luminescent devices exceeds a third predetermined value, wherein:
  the first impedance device is coupled in parallel to the first two-terminal current controller and coupled in series to the first luminescent device; and
  the second impedance device is coupled in parallel to the second two-terminal current controller and coupled in series to the second luminescent device.

39. The LED lighting device of claim 35, wherein the first impedance device comprises:
 a second two-terminal current controller coupled in series to the first two-terminal current controller and configured to regulate the second current according to a voltage established across the second two-terminal current controller.

40. The LED lighting device of claim 17, further comprising:
 a third luminescent device coupled in series to the first luminescent device and the second luminescent device for providing light according to a fourth current;
 a second two-terminal current controller coupled in parallel to the third luminescent device and in series to the first two-terminal current controller and the fourth luminescent device and configured to regulate the second current according to a voltage established across the second two-terminal current controller;
 wherein the first impedance device comprises a third two-terminal current controller coupled in series to the first two-terminal current controller and the second two-terminal current controller, and configured to regulate the fourth current according to a voltage established across the third two-terminal current controller.

41. The LED lighting device of claim 17 further comprising a power supply circuit configured to provide the rectified AC voltage for driving the first luminescent device and the second luminescent device.

42. The LED lighting device of claim 41 wherein the power supply circuit includes an AC-AC voltage converter.

43. The LED lighting device of claim 17, wherein the first luminescent device, the second luminescent device, the first impedance device, the first two-terminal current controller and the adjusting unit are disposed on a same circuit board.

44. The LED lighting device of claim 17, further comprising:
 a silicon-controlled rectifier coupled in parallel to the first luminescent device and configured to:
  conduct a fourth current when a voltage established across the first luminescent device exceeds a break-over voltage; or
 switch off when the voltage established across the first luminescent device does not exceed the break-over voltage.

45. The LED lighting device of claim 44, wherein the first luminescent device, the second luminescent device, the first impedance device, the first two-terminal current controller, the adjusting unit and the silicon-controlled rectifier are disposed on a same circuit board.

\* \* \* \* \*

UNITED STATES PATENT AND TRADEMARK OFFICE
CERTIFICATE OF CORRECTION

PATENT NO. : 8,638,047 B2  
APPLICATION NO. : 13/743345  
DATED : January 28, 2014  
INVENTOR(S) : Yung-Hsin Chiang et al.

Page 1 of 1

It is certified that error appears in the above-identified patent and that said Letters Patent is hereby corrected as shown below:

On the title page, item (72), correct the residence of the third inventor from "Mountian View" to --Mountain View--.

Signed and Sealed this  
Sixth Day of May, 2014

Michelle K. Lee  
*Deputy Director of the United States Patent and Trademark Office*